United States Patent
Kentley-Klay et al.

(10) Patent No.: US 11,846,514 B1
(45) Date of Patent: Dec. 19, 2023

(54) USER INTERFACE AND AUGMENTED REALITY FOR REPRESENTING VEHICLES AND PERSONS

(71) Applicant: Zoox, Inc., Foster City, CA (US)

(72) Inventors: Timothy David Kentley-Klay, Stanford, CA (US); Duncan John Curtis, Hayward, CA (US); Donovan Anton Bass, San Francisco, CA (US); Michael Moshe Kohen, Palo Alto, CA (US); Auver Cedric Austria, Vic (AU)

(73) Assignee: Zoox, Inc., Foster City, CA (US)

( * ) Notice: Subject to any disclaimer, the term of this patent is extended or adjusted under 35 U.S.C. 154(b) by 632 days.

(21) Appl. No.: 15/970,072

(22) Filed: May 3, 2018

(51) Int. Cl.
*G01C 21/34* (2006.01)
*G06Q 10/02* (2012.01)
*G06T 15/20* (2011.01)
*H04W 4/02* (2018.01)
*G06T 19/00* (2011.01)

(52) U.S. Cl.
CPC ......... *G01C 21/3438* (2013.01); *G06Q 10/02* (2013.01); *G06T 15/205* (2013.01); *G06T 19/006* (2013.01); *H04W 4/025* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 10,152,053 B1 | 12/2018 | Smith et al. | |
| 10,310,505 B1 | 6/2019 | Hanson et al. | |
| 10,372,141 B2 | 8/2019 | Donnelly et al. | |
| 10,446,037 B2 | 10/2019 | Kentley-Klay et al. | |
| 10,837,788 B1* | 11/2020 | Kentley-Klay | G06K 9/00369 |
| 2007/0035562 A1 | 2/2007 | Azuma et al. | |
| 2011/0115615 A1* | 5/2011 | Luo | H04N 13/239 340/436 |

(Continued)

OTHER PUBLICATIONS

Final Office Action dated Dec. 30, 2019 for U.S. Appl. No. 15/970,006 "User Interface and Augmented Reality for Identifying Vehicles and Persons" Kentley-Klay, 26 pages.

(Continued)

*Primary Examiner* — Peter D Nolan
*Assistant Examiner* — Michael F Whalen
(74) *Attorney, Agent, or Firm* — Lee & Hayes, P.C.

(57) ABSTRACT

Techniques for assisting a passenger to identify a vehicle and for assisting a vehicle to identify a passenger are discussed herein. Also discussed herein are techniques for capturing data via sensors on a vehicle or user device and for presenting such data in various formats. For example, in the context of a ride hailing service using autonomous vehicles, the techniques discussed herein can be used to identify a passenger of the autonomous vehicle at the start of a trip, and can be used to assist a passenger to identify an autonomous vehicle that has been dispatched for that particular passenger. Additionally, data captured by sensors of the vehicle and/or by sensors of a user device can be used to initiate a ride, determine a pickup location, orient a user within an environment, and/or provide visualizations or augmented reality elements to provide information and/or enrich a user experience.

20 Claims, 18 Drawing Sheets

(56) References Cited

U.S. PATENT DOCUMENTS

| | | | |
|---|---|---|---|
| 2013/0321398 A1* | 12/2013 | Howard | G06T 17/20 345/419 |
| 2015/0202962 A1 | 7/2015 | Habashima et al. | |
| 2015/0215585 A1* | 7/2015 | Filip | G06T 5/002 348/148 |
| 2015/0339928 A1 | 11/2015 | Ramanujam | |
| 2017/0006234 A1* | 1/2017 | Higuchi | G06T 3/4038 |
| 2017/0032570 A1 | 2/2017 | Bear et al. | |
| 2017/0090480 A1 | 3/2017 | Ho et al. | |
| 2017/0132934 A1 | 5/2017 | Kentley et al. | |
| 2017/0158023 A1 | 6/2017 | Stevanovic et al. | |
| 2017/0162057 A1 | 6/2017 | Ross et al. | |
| 2017/0249846 A1 | 8/2017 | Ignaczak et al. | |
| 2017/0277191 A1 | 9/2017 | Fairfield et al. | |
| 2017/0327082 A1 | 11/2017 | Kamhi et al. | |
| 2018/0074494 A1 | 3/2018 | Myers et al. | |
| 2018/0074495 A1 | 3/2018 | Myers et al. | |
| 2018/0075565 A1 | 3/2018 | Myers et al. | |
| 2018/0082135 A1* | 3/2018 | Crawford | G05D 1/0038 |
| 2018/0338229 A1 | 11/2018 | Nemec et al. | |
| 2018/0349699 A1 | 12/2018 | O'Connell et al. | |
| 2018/0365400 A1 | 12/2018 | Lopez-Hinojosa et al. | |
| 2019/0012909 A1 | 1/2019 | Mintz | |
| 2019/0065027 A1* | 2/2019 | Hauenstein | G06F 3/014 |
| 2019/0072400 A1 | 3/2019 | Chamberlain et al. | |
| 2019/0072408 A1* | 3/2019 | Lee | G06T 19/003 348/148 |
| 2019/0108558 A1 | 4/2019 | Spivack et al. | |
| 2019/0108757 A1 | 4/2019 | Watanabe | |
| 2019/0114921 A1 | 4/2019 | Cazzoli | |
| 2019/0184121 A1 | 6/2019 | Haibach et al. | |
| 2019/0197323 A1 | 6/2019 | Sakai et al. | |
| 2019/0206258 A1 | 7/2019 | Chang et al. | |
| 2019/0212158 A1 | 7/2019 | Gordon et al. | |
| 2019/0244515 A1 | 8/2019 | Hacker et al. | |
| 2019/0318159 A1 | 10/2019 | Blanc-Paques et al. | |
| 2019/0340453 A1 | 11/2019 | Papineau et al. | |
| 2020/0134763 A1* | 4/2020 | Ghannam | G06K 9/22 |
| 2020/0151916 A1* | 5/2020 | Kenney | G06T 11/00 |
| 2020/0160709 A1 | 5/2020 | Ramot et al. | |
| 2020/0302199 A1* | 9/2020 | Noguchi | G06K 9/00832 |

OTHER PUBLICATIONS

Non Final Office Action dated Feb. 3, 2020 for U.S. Appl. No. 15/970,044 "Techniques for Identifying Vehicles and Persons" Kentley-Klay, 6 pages.

Office action for U.S. Appl. No. 15/970,006, dated Sep. 12, 2019, Kentley-Klay, "User Interface and Augmented Reality for Identifying Vehicles and Persons", 23 pages.

* cited by examiner

USER INTERFACE AND AUGMENTED REALITY FOR REPRESENTING VEHICLES AND PERSONS

BACKGROUND

Ride hailing services allow a user to request a vehicle to provide transportation services to the user. One challenge of such services is to connect the user and the vehicle at the start of a trip. Often, a user hails a vehicle without knowing which vehicle to look for at the start of the trip. Similarly, a driver of the vehicle may not know an identity of the user, resulting in frustration, delay, or picking up the wrong user as a passenger.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
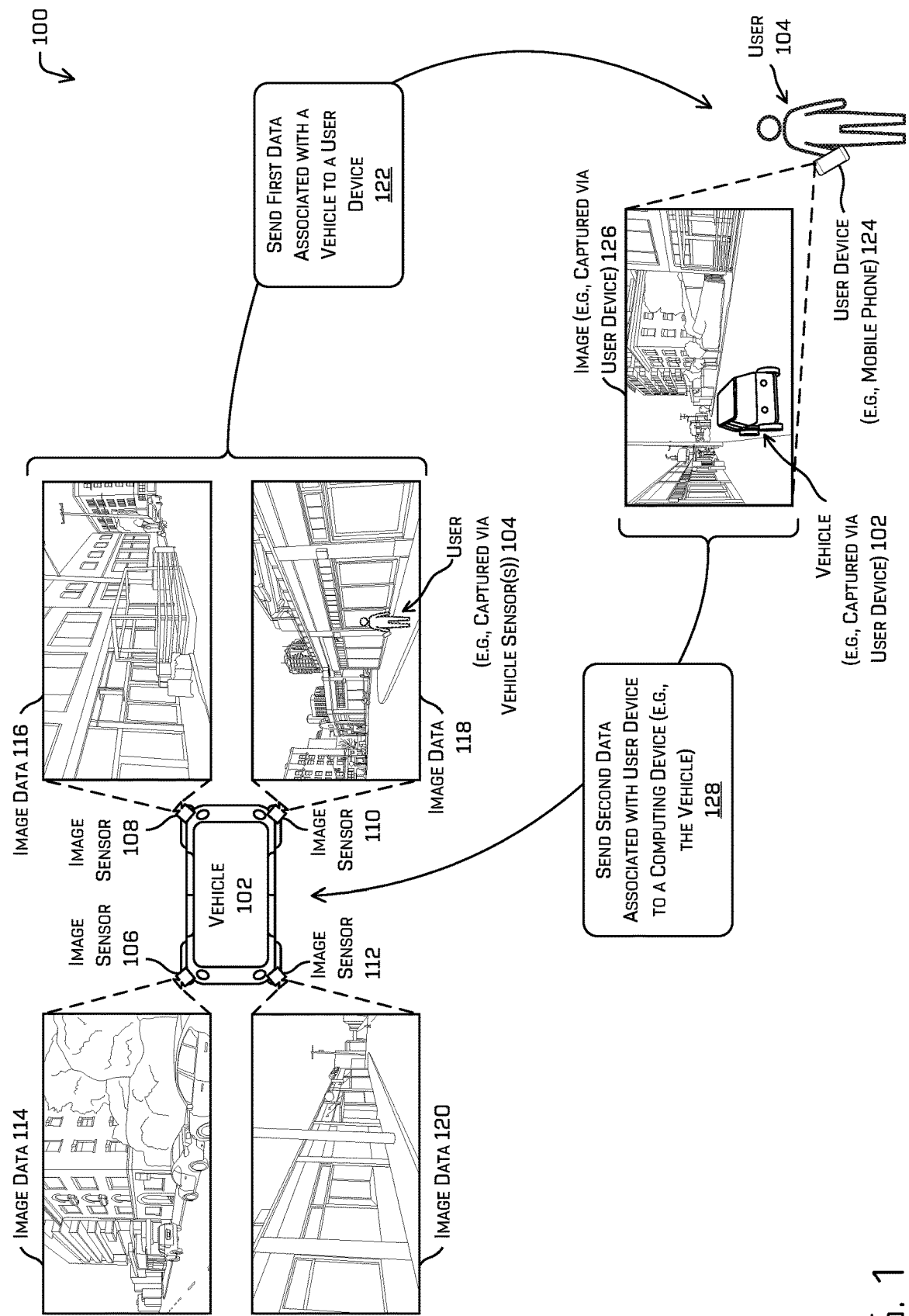
FIG. 1 is a pictorial flow diagram of an example process for exchanging data between a user and a vehicle to facilitate identifying vehicles and persons, in accordance with embodiments of the disclosure.

This disclosure is directed to techniques for identifying a rider or for identifying a vehicle using data captured by various sensors of a user device or of a vehicle. For example, in the context of a ride hailing service using autonomous vehicles, the techniques discussed herein can be used to identify a passenger of the autonomous vehicle at the start of a trip, and can be used to assist a passenger to identify an autonomous vehicle that has been dispatched for that particular passenger. Additionally, data captured by sensors of the vehicle and/or by sensors of a user device can be used to initiate a ride, determine a pickup location, orient a user within an environment, and/or provide visualizations or augmented reality elements to provide information and/or enrich a user experience. Such augmented reality elements (also referred to as virtual elements or computer-generated elements) generally comprise artifacts rendered, for example, on a display in conjunction with image data of a portion of an environment such that the artifact appears to be naturally appearing in the environment. Various examples of such renderings with respect to the techniques are provided herein.

In some cases, sensors on a vehicle can capture data of an environment and can provide at least a portion of that data to a user device. In one example, a vehicle can include one or more image sensors that capture image data of an environment. In some cases, the image data can include a representation of the user to be picked up as a passenger of the vehicle. At least a portion of the data can be provided to a user device of a user, who may or may not be the intended passenger (e.g., when a user initiates a ride for another individual). In one example, the image data can be provided to the passenger as the vehicle arrives to pick up the passenger. In some cases, the user device can display the image data so that a user can confirm an identity of the passenger (e.g., that the passenger is the correct person) or so that the user can indicate a location which can correspond to a pickup location.

In another example, the vehicle can capture image data, LIDAR data, radar data, sonar data, and the like of an environment to localize the vehicle to a map of the environment. In some instances, the map can include a detailed, three-dimensional map of the environment. In some instances, the vehicle can capture data representing a user in the environment as well. In one example, the vehicle can provide, to a user device, image data representing a perspective view of the environment, which can include representations of the vehicle and/or of the user and may generally be referred to as the vehicle taking a "selfie," as it is taking a "photo" of itself. In some instances, a virtual representation of the vehicle can be added to image data. In this manner, the user can view the context of an environment to aid the user in identifying a vehicle intended for the user as the vehicle approaches a pickup location. In some instances, the perspective view (and indeed, all of the image data discussed herein) can represent a photo-realistic view of the environment, can represent a simplified and/or stylized view of the environment, and/or can include augmented reality elements to highlight objects in the environment or to provide information or entertainment.

In some examples, a user can capture image data of an environment using a user device associated with the user. In various implementations, the user device can present one or more augmented reality elements to assist the user in identifying a vehicle, in identifying a pickup location, or by providing information about one or more objects in the environment. For example, a user device can present image data with augmented reality elements (e.g., footsteps, breadcrumbs, etc.) indicating a path to a vehicle and/or to a pickup location. In some examples, the augmented reality elements can illustrate a representation of at least a portion of a vehicle that is obscured by an object in image data captured by the user device. In some instances, the augmented reality element can illustrate an orientation of the user device (e.g., as a compass) and can provide a directive to change an orientation of the user device to capture image data of a particular object, vehicle, pickup location, and the like. In some instances, the augmented reality element can illustrate various buildings or landmarks in an environment.

In another example, as a vehicle approaches a pickup location associated with a user, the user can request, via a user device, data representing image data or video data captured by the vehicle en route to the pick up the user. When a vehicle approaches a pickup location, or when a user approaches a pickup location, the user can capture image data of an environment and can present the image data with augmented reality elements indicating which vehicle (e.g., out of a row of vehicles) corresponds to the vehicle that was dispatched for the user.

In one example, a user can initiate a ride by capturing image data of an environment and sending the image data (e.g., with or without location information) to a computing device to dispatch a vehicle to pick up the user. In response to receiving the image data and/or the location information, the computing device can determine a location of the user based on comparing the image data with a map to recognize a location of the user. Upon determining the location of the user, the computing device can send a vehicle to a pickup location associated with the location to pick up the user.

In another example, a user can send image data of a passenger to a vehicle and/or to a computing device associated with the vehicle, to assist the vehicle in finding the passenger for providing the transportation services discussed herein. Upon approaching a pickup location, the vehicle can capture image data of the environment and can use image recognition to determine an identity of a user that corresponds to the identity of the passenger. The vehicle and/or the computing device can use, as ground truth information, image data provided by a user, image data provided by a user who requested a vehicle for another person, image data captured by the vehicle in a previous ride, image data scrapped from the Internet (e.g., social media profiles accessible via a social media platform, work profiles, and the like), etc.

In one example, the vehicle can send identification data to a user device to attempt to locate a user in a crowded location, for example. In some instances, the identification data can include a unique code, image data, a color, a pattern of colors, a pattern to control a strobe, light, or flash of the user device (whether visible to the naked eye, or not (e.g., by emission of infrared or ultraviolet signals)), or audio to be presented by the user device (whether or not audible, e.g., including subsonic and ultrasonic tones). The user device can present the identification data (e.g., by holding up a mobile phone so that a display is oriented towards the vehicle). In some instances, the vehicle can capture sensor data of the environment and can determine whether the sensor data corresponds to the identification data associated with the user. Based at least in part on determining that the sensor data corresponds to the identification data of a user, the vehicle can determine a pickup location to pick up a corresponding passenger.

The techniques discussed herein can improve a functioning of a computing device in a number of ways. For example, in the context of generating augmented reality elements, the incorporation of sensor data captured by a vehicle (e.g., distance, height, etc.) can provide for more accurate representations of augmented reality elements when presented via a display. In some instances, the three-dimensional map of an environment can be used to generate shape models, which can facilitate robust augmented reality elements to be displayed. Further, the techniques discussed herein to facilitate the identification of vehicles and/or passengers can reduce congestion in cities, can reduce delay, and/or can improve efficiency at crowded drop off/pick up locations (e.g., an airport). Further, incorporation of image data to verify a user identity can reduce instances where a wrong passenger is picked up by a vehicle. Additionally, displaying data in one or more user interfaces, as discussed herein, can improve a user experience by keeping a user informed and engaged in the transportation process. These and other improvements to the functioning of the computer and/or to the user experience are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems, and is not limited to autonomous vehicles. In another example, the techniques can be utilized in an aviation or nautical context, or in any system using machine vision. Additionally, the techniques described herein can be used with real data (e.g., captured using sensor(s)), simulated data (e.g., generated by a simulator), or any combination of the two.

FIG. 1 is a pictorial flow diagram of an example process 100 for exchanging data between a user and a vehicle to facilitate identifying vehicles and persons, in accordance with embodiments of the disclosure. As illustrated, a vehicle 102 can be traversing an environment to approach a pickup location to pick up a user 104. In some examples, the vehicle 102 can include one or more sensors, such as image sensors 106, 108, 110, and 112, which may be, for example, RGB cameras, intensity/grey scale cameras, depth cameras, time of flight cameras, infrared cameras, RGB-D cameras, and the like. Of course, the vehicle 102 can include any number and/or any type of sensors oriented in any directions on the vehicle 102. For example, the vehicle 102 can include sensors including, but not limited to, one or more of LIDAR (light detection and ranging) sensors, radar sensors, sonar sensors, wheel encoders, inertial measurement units (IMUs) (which can include gyroscopes, magnetometers, accelerometers, etc.), GPS sensors, image sensors, and the like. The image sensors 106, 108, 110, and 112 can capture corresponding image data 114, 116, 118, and 120, respectively. In some instances, the image data 118 can include a representation of the user 104.

At operation 122, the process can include sending first data associated with a vehicle to a user device. In some instances, the first data can include, but is not limited to, any one or more of the image data 114, 116, 118, and 120 captured by the respective image sensors 106, 108, 110, and 112 of the vehicle 102. Of course, the first data sent in the operation 122 is not limited to image data, and can include any data, models, or information captured by or associated with various sensors or systems discussed herein.

The user 104 can be associated with a user device 124 (e.g., a mobile phone), which can receive the data sent in the operation 122. Additionally, the user device 124 can capture data in the environment and can send such data to the vehicle 102 and/or to a computing device associated with the vehicle 102.

In some instances, the user device 124 can capture image data 126, which can include a representation of the vehicle 102. Of course, the user device 124 can capture data by one or more sensors of the user device 124.

At operation 128, the process can include sending second data associated with the user device to a computing device. In some instances, the computing device can be included in the vehicle 102, and in some instances, the computing device can be remote from the vehicle 102. In some instances, the second data can correspond to the image data 126. Of course, the second data can include location data, such as GPS information, associated with the user device 124, identity information associated with the user device 124, and the like.

In some instances, the vehicle 102 can receive the second data sent in the operation 128 and can use the second data to determine a pickup location, determine a user identity, and the like, as discussed herein. As would be appreciated, such a determination could be made on any of the user device 124, the vehicle 102, or any other intermediary computing platform.

Additional examples of data that that can be captured by the vehicle 102 and/or by the user device 124, and how such can be exchanged and used, are discussed throughout this disclosure.

Figure 2:
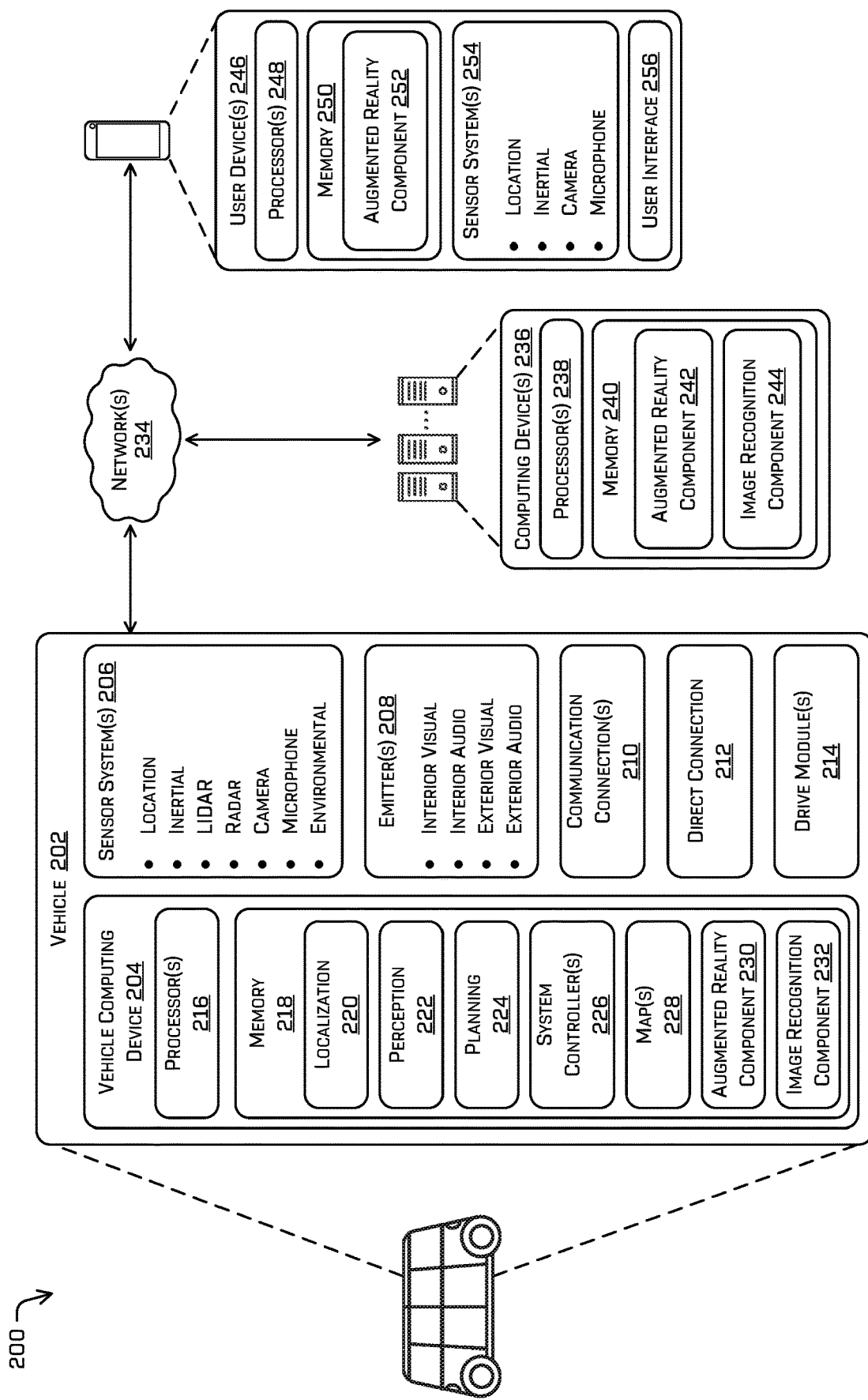
FIG. 2 depicts a block diagram of an example system for implementing the techniques described herein.

FIG. 2 depicts a block diagram of an example system 200 for implementing the techniques described herein. In at least one example, the system 200 can include a vehicle 202, which can correspond to the vehicle 102 in FIG. 1.

The vehicle 202 can include a vehicle computing device 204, one or more sensor systems 206, one or more emitters 208, one or more communication connections 210, at least one direct connection 212, and one or more drive modules 214.

The vehicle computing device 204 can include one or more processors 216 and memory 218 communicatively coupled with the one or more processors 216. In the illustrated example, the vehicle 202 is an autonomous vehicle; however, the vehicle 202 could be any other type of vehicle, or any other system having at least an image capture device (e.g., a camera enabled smartphone). In the illustrated example, the memory 218 of the vehicle computing device 204 stores a localization component 220, a perception component 222, a planning component 224, one or more system controllers 226, one or more maps 228, an augmented reality component 230, and an image recognition component 232. Though depicted in FIG. 2 as residing in memory 218 for illustrative purposes, it is contemplated that the localization component 220, the perception component 222, the planning component 224, the one or more system controllers 226, the one or more maps 228, the augmented reality component 230, and the image recognition component 232 can additionally, or alternatively, be accessible to the vehicle 202 (e.g., stored on, or otherwise accessible by, memory remote from the vehicle 202).

In at least one example, the localization component 220 can include functionality to receive data from the sensor system(s) 206 to determine a position and/or orientation of the vehicle 202 (e.g., one or more of an x-, y-, z-position, roll, pitch, or yaw). For example, the localization component 220 can include and/or request/receive a map of an environment and can continuously determine a location and/or orientation of the autonomous vehicle within the map. In some instances, the localization component 220 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 220 can provide data to various components of the vehicle 202 to determine an initial position of an autonomous vehicle for generating a candidate trajectory, as discussed herein.

In some instances, the perception component 222 can include functionality to perform object detection, segmentation, and/or classification. In some examples, the perception component 222 can provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional and/or alternative examples, the perception component 222 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 224 can determine a path for the vehicle 202 to follow to traverse through an environment. For example, the planning component 224 can determine various routes and trajectories and various levels of detail. For example, the planning component 224 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 224 can generate an instruction for guiding the autonomous vehicle along at least a portion of the route from the first location to the second location. In at least one example, the planning component 224 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 202 to navigate.

In at least one example, and as discussed herein, the planning component 224 can determine a location of a user based on image data of an environment received from the user using, for example, bags of binary words with image based features, artificial neural network, and the like. Further, the planning component 224 can determine a pickup location associated with a location. As used herein, a pickup location can be a specific location (e.g., a parking space, a loading zone, a portion of a ground surface, etc.) within a threshold distance of a location (e.g., an address or location associated with a dispatch request) where the vehicle 202 can stop to pick up a passenger. In at least one example, the planning component 224 can determine a pickup location based at least in part on determining a user identity (e.g., determined via image recognition or received as an indication from a user device, as discussed herein).

In at least one example, the vehicle computing device 204 can include one or more system controllers 226, which can be configured to control steering, propulsion, braking, safety, emitters, communication, and other systems of the vehicle 202. These system controller(s) 226 can communicate with and/or control corresponding systems of the drive module(s) 214 and/or other components of the vehicle 202.

The memory 218 can further include one or more maps 228 that can be used by the vehicle 202 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 228 can include at least one map (e.g., images and/or a mesh). In some example, the vehicle 202 can be controlled based at least in part on the maps 228. That is, the maps 228 can be used in connection with the localization component 220, the perception component 222, and/or the planning component 224 to determine a location of the vehicle 202, identify objects in an environment, and/or generate routes and/or trajectories to navigate within an environment.

In some examples, the one or more maps 228 can be stored on a remote computing device(s) (such as the computing device(s) 236) accessible via network(s) 234. In some examples, multiple maps 228 can be stored based on, for example, a characteristic (e.g., type of entity, time of day, day of week, season of the year, etc.). Storing multiple maps 228 can have similar memory requirements, but increase the speed at which data in a map can be accessed.

In some instances, portions of the map can be used to generate shape models that can be used to generate augmented reality elements, as discussed herein. For example, a three-dimensional mesh of the environment can be used to determine a shape of a building such that when image data is captured by a user device, for example, the augmented reality component 230 can use a shape model to determine a presence of the building in the image data, and accordingly, can highlight or otherwise generate an augmented reality element associated with such an object. In general, augmented scenes can be created based on a known pose (position and orientation) of a sensor (e.g., an image sensor) with respect to such a map so that artificial objects can be rendered with a proper perspective, etc.

The augmented reality component 230 can include functionality to generate or provide information that can be used to generate one or more augmented reality elements (also referred to as virtual element(s) or computer-generated element(s)) for presentation. For example, the augmented reality component 230 can use SLAM based techniques to determine floors, walls, points of interest, etc. (or otherwise determine such locations based on information provided from the one or more maps), for which to use in generating augmented reality elements. In some instances, the augmented reality component 230 can receive image data, LIDAR data, radar data, and the like to determine a mesh of an environment onto which augmented reality elements can be projected. In some instances, the augment reality component 230 can include one or more shape models of objects to represent as an augmented reality element. For example, the augmented reality component 230 can include a shape model of the vehicle 202 to identity the vehicle 202 in image data and to project augmented reality elements onto a representation of the vehicle 202. The augmented reality component 230 can also use marker-based augmented reality algorithms to generate augmented reality elements. Additional aspects of the augmented reality component 230 are discussed throughout this disclosure.

The image recognition component 232 can include functionality to identify one or more persons, buildings, locations, and the like, in data captured by sensors on the vehicle 202 and/or in data provided to the vehicle 202. For example, the image recognition component 232 can receive image data representing a user (e.g., captured by a user device and provided to the vehicle 202) and can receive image data captured by one or more sensors of the vehicle 202 to determine that the user is represented in such image data. For example, the image recognition component 232 can use an image recognition algorithm to compare unknown image data (or image data representing an unknown user) with image data including a known representation of a user to determine if the user is represented in such image data. In some instances, the image recognition component 232 can be used to determine a location represented in image data received from a user device (e.g., to determine a location associated with a user). Additional aspects of the image recognition component 232 are discussed throughout this disclosure.

In some instances, aspects of some or all of the components discussed herein can include any models, algorithms, and/or machine learning algorithms. For example, in some instances, the components in the memory 218 (and the memory 240 and 250, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 206 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 206 can include multiple instances of each of these or other types of sensors. For instance, the LIDAR sensors can include individual LIDAR sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the vehicle computing device 204. Additionally or alternatively, the sensor system(s) 206 can send sensor data, via the one or more networks 234, to the one or more computing device(s) at a particular frequency, after a lapse of a predetermined period of time, in near real-time, etc.

The vehicle 202 can also include one or more emitters 208 for emitting light and/or sound, as described above. The emitters 208 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 202 can also include one or more communication connection(s) 210 that enable communication between the vehicle 202 and one or more other local or remote computing device(s). For instance, the communication connection(s) 210 can facilitate communication with other local computing device(s) on the vehicle 202 and/or the drive module(s) 214. Also, the communication connection(s) 210 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the vehicle computing device 204 to another computing device or a network, such as network(s) 234. For example, the communications connection(s) 210 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 can include one or more drive modules 214. In some examples, the vehicle 202 can have a single drive module 214. In at least one example, if the vehicle 202 has multiple drive modules 214, individual drive modules 214 can be positioned on opposite ends of the vehicle 202 (e.g., the front and the rear, etc.). In at least one example, the drive module(s) 214 can include one or more sensor systems to detect conditions of the drive module(s) 214 and/or the surroundings of the vehicle 202. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 214. In some cases, the sensor system(s) on the drive module(s) 214 can overlap or supplement corresponding systems of the vehicle 202 (e.g., sensor system(s) 206).

The drive module(s) 214 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage j unction, a high voltage cable, charging system, charge port, etc.). Additionally, the drive module(s) 214 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 214. Furthermore, the drive module(s) 214 also include one or more communication connection(s) that enable communication by the respective drive module with one or more other local or remote computing device(s).

In at least one example, the direct connection 212 can provide a physical interface to couple the one or more drive module(s) 214 with the body of the vehicle 202. For example, the direction connection 212 can allow the transfer of energy, fluids, air, data, etc. between the drive module(s) 214 and the vehicle. In some instances, the direct connection 212 can further releasably secure the drive module(s) 214 to the body of the vehicle 202.

In at least one example, the localization component 220, perception component 222, the planning component 224, the augmented reality component 230, and/or the image recognition component 232 can process sensor data, as described above, and can send their respective outputs, over the one or more network(s) 234, to one or more computing device(s) 236 and/or to one or more user device(s) 246 (also referred to as a user device 246). In at least one example, the localization component 220, the perception component 222, the planning component 224, the augmented reality component 230, and/or the image recognition component 232 can send their respective outputs to the one or more computing device(s) 236 at a particular frequency, after a lapse of a predetermined period of time, in near real-time, etc.

As described above with reference to FIG. 1, and as discussed throughout this disclosure, the vehicle 202 can send sensor data to one or more computing device(s) 236 and/or the user device(s) 246, via the network(s) 234. In some examples, the vehicle 202 can send raw sensor data to the computing device(s) 236 and/or the user device(s) 246. In other examples, the vehicle 202 can send processed sensor data and/or representations of sensor data to the computing device(s) 236 and/or the user device(s) 246. In some examples, the vehicle 202 can send sensor data to the computing device(s) 236 and/or the user device(s) 246 at a particular frequency, after a lapse of a predetermined period of time, in near real-time, etc. In some cases, the vehicle 202 can send sensor data (raw or processed) to the computing device(s) 236 and/or the user device(s) 246 as one or more log files.

The computing device(s) 236 can receive the sensor data (raw or processed) to facilitate locating vehicles and/or user, as discussed herein. For example, the computing device(s) 236 can receive image data from the user device 246 to determine a location associated with the user device 246 and/or an identity of the user associated with the user device 246. In at least one example, the computing device(s) 236 can include processor(s) 238 and memory 240 communicatively coupled with the processor(s) 238. In the illustrated example, the memory 240 of the computing device(s) 236 stores an augmented reality component 242 and an image recognition component 244. In at least one example, the augmented reality component 242 and the image recognition component 244 can correspond to the augmented reality component 230 and the image recognition component 232, respectively.

In at least one example, the vehicle 202 can send and/or receive data to and from the user device(s) 246, via the network(s) 234. As described above, the user device(s) 246 can be associated with a mobile device of a passenger (to be picked up) and/or of a user who hailed the vehicle 202 for another passenger. In some examples, the vehicle 202 can send raw sensor data to the user device(s) 246. In other examples, the vehicle 202 can send processed sensor data to the user device(s) 246. In at least one example, the vehicle 202 can send sensor data (e.g., raw or processed) to an intermediary device, which can send a representation of the sensor data to the user device(s) 246. In some examples, the vehicle 202 can send sensor data to the user device(s) 246 at a particular frequency, after a lapse of a predetermined period of time, in near real-time, responsive to a request from the user device 246, etc. The user device(s) 246 can receive the sensor data (raw or processed) and can output the sensor data to assist an associated user with locating the vehicle 202, or can assist an associated user with determining a user identity of a passenger to be picked up by the vehicle 202. In at least one example, the user device(s) 246 can include one or more processors 248 and memory 250 communicatively coupled with the one or more processors 248. In the illustrated example, the memory 250 of the remote computing device(s) 246 stores an augmented reality component 252. In at least one example, the augmented reality component 252 can be downloaded by the user device(s) 246.

The user device 246 can further include one or more sensors systems 254, which can include, location sensor(s) (e.g., GPS sensor(s)), inertial (e.g., accelerometer(s), magnetometer(s), etc.), camera(s), microphone(s), and the like. The user device 246 can further include one or more user interfaces 256, which can include, but is not limited to, one or more displays (e.g., including input capabilities), gesture-based inputs, haptic feedback, etc.

The augmented reality component 252 can include functionality to receive image data captured by the sensor system 254 and/or by the vehicle 202 and presented via the user interface 256. For example, the augmented reality component 252 can include the functionality as discussed above in connection with the augmented reality component 230. In some instances, the augmented reality component 252 can receive sensor data captured by the vehicle 202, such as a height of the user device 246 above the ground, a distance between the user device 246 and a location and/or an orientation of the user device 246 in the environment, etc. In some instances, the augmented reality component 252 can perform processing to generate one or more augmented reality elements (also referred to as one or more virtual objects or elements), as discussed herein. In some examples, and as discussed above, the data (including one or more augmented reality elements) can be output via the user interface 256. In some examples, the user interface 256 can be an emitter (e.g., light, sound, etc.), as described above. In some examples, the visual indicator and/or audible indicator can be associated with a graphical user interface.

In one example, the augmented reality component 252 can include functionality to localize the user device 246 (e.g., to determine a position and/or orientation) with respect to image data captured by the user device 246 and/or map data provided by the vehicle 202 and/or by the computing device(s) 236. In some instances, localization operations can be based on, but is not limited to, image data, IMU data, magnetometer data, and/or GPS data from the user device 306. In another example, accurate localization of the user device 306 may not be necessary, requiring only a rough orientation and location. In such an example, a GPS signal, magnetometer, and/or IMU signals may be sufficient to give a coarse enough location and heading of the user device 246 to render the augmented reality elements in image data.

The processor(s) 216 of the vehicle 202, the processor(s) 238 of the computing device(s) 236, and/or the processor(s) 248 of the user device(s) 246 can be any suitable processor capable of executing instructions to process data and perform operations as described herein. By way of example and not limitation, the processor(s) 216, 238, and 248 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218, 240, and 250 are examples of non-transitory computer-readable media. The memory 218, 240, and 250 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 2 is illustrated as a distributed system, in alternative examples, components of the vehicle 202 can be associated with the computing device(s) 236 and/or components of the computing device(s) 236 can be associated with the vehicle 202. That is, the vehicle 202 can perform one or more of the functions associated with the computing device(s) 236, and vice versa. Further, aspects of the augmented reality components and/or the image recognition components can be performed on any of the devices discussed herein.

FIGS. 1, 3, and 11-18 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. For example, some figures include numbering such as ①, ②, ③, etc. This numbering is intended to orient a reader to one possible order of operations, but is not intended to be construed as a limitation, as discussed herein.

Figure 3:
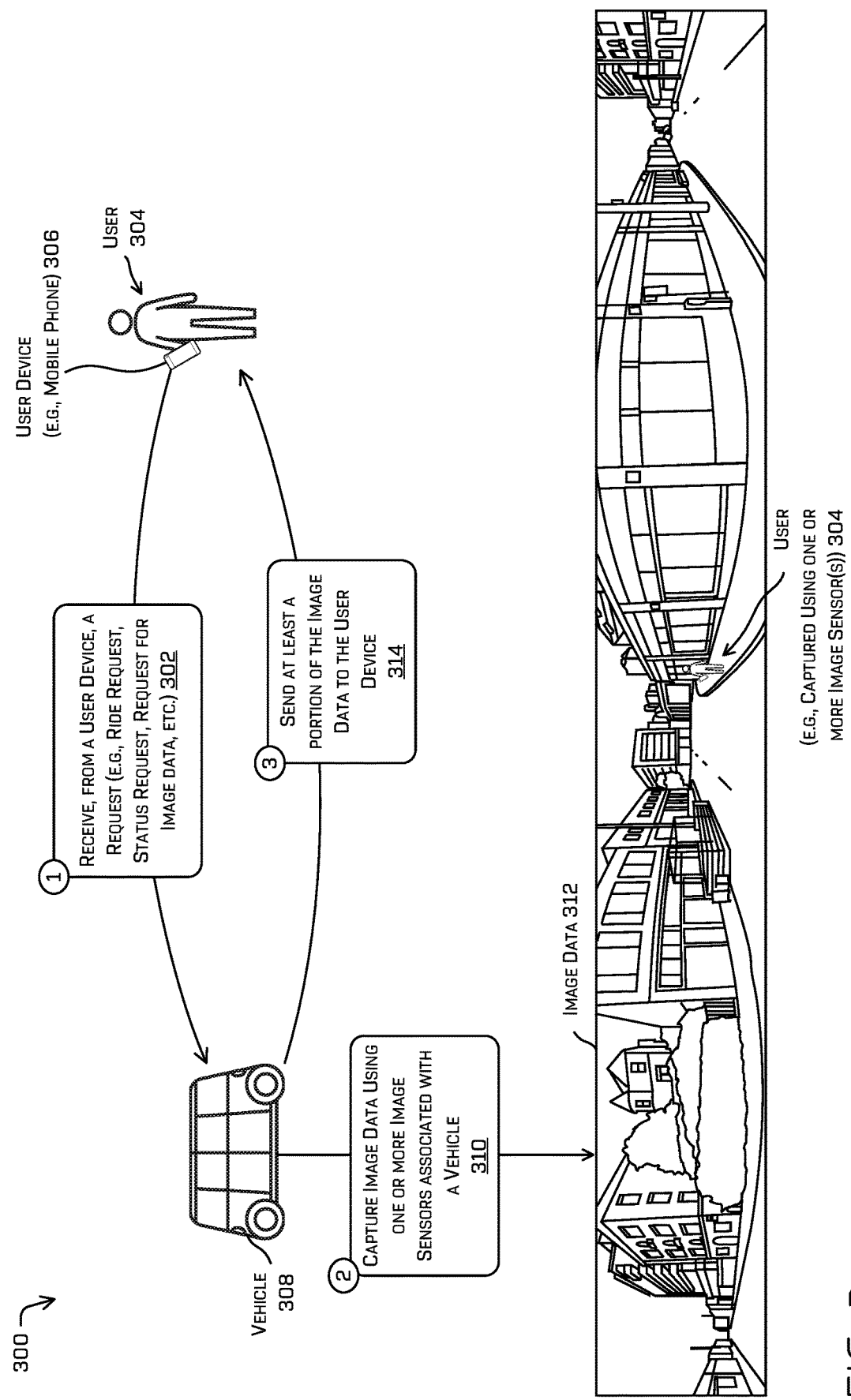
FIG. 3 is a pictorial flow diagram of an example process for providing image data to a user, where the image data includes a representation of the user, in accordance with embodiments of the disclosure.

FIG. 3 is a pictorial flow diagram of an example process 300 for providing image data to a user, where the image data includes a representation of the user, in accordance with embodiments of the disclosure. For example, some or all of the process 300 can be performed by one or more components in FIG. 2, as described herein.

At operation 302, the process can include receiving, from a user device, a request. In some examples, the request can include a ride request (e.g., a request to dispatch a vehicle to a location to provide transportation services to a passenger, also referred to as a request for transportation), a status request (e.g., a request for a status or information about the state of a vehicle), a request for image data (or other data), and the like. For example, the request can include a viewing perspective for a rendering to be generated by the vehicle 308 and provided to the user device 306. As illustrated, a user 304 can be associated with a user device 306, such as a mobile device. The user 304 can generate the request and send the request to a vehicle 308. In some instances, the vehicle 308 can receive the request, and in some instances, a computing device (e.g., the computing device(s) 236) can receive the request and send the request to the vehicle 308.

At operation 310, the process can include capturing image data using one or more image sensors associated with the vehicle 308. In some instances, the vehicle 308 can correspond to a vehicle dispatched to pick up the user 304. As illustrated, image data 312 represents an environment proximate to the vehicle 308. In some instances, the image data 312 can include a representation of the user 304. In some instances, the image data 312 can represent a panorama (e.g., 360-degree view around the vehicle 308), while in some instances, the image data 312 can represent individual images captured by various image sensors and combined (e.g., a combined image or a composite image), as discussed here. Of course, though described in FIG. 3 with respect to image data for illustrative purposes, sensor data from any one or more sensors (e.g., LIDAR, RADAR, etc.) available to the vehicle 308 can be captured. Such capture of data proximate to the vehicle may generally be referred to as a vehicle "selfie."

At operation 314, the process can include sending at least a portion of the image data (e.g., the image data 312), or sensor data more generally, to the user device (e.g., the user device 306). In some instances, the operation 314 can include performing any image processing on the image data 312, including, but not limited to, color correction, brightness correction, cropping, warping, combining image data to generate a panorama, and the like. Thus, the process 300 can provide an image of the user 304 as requested by the user 304 via the user device 306. Accordingly, in at least one implementation, the image data 312 can be considered to be a "selfie" with respect to the vehicle 308. In some instances, as discussed herein, the person represented in the image data 312 can be the same person or a different person as the user 304 who initiated a request in the operation 302.

Figure 4:
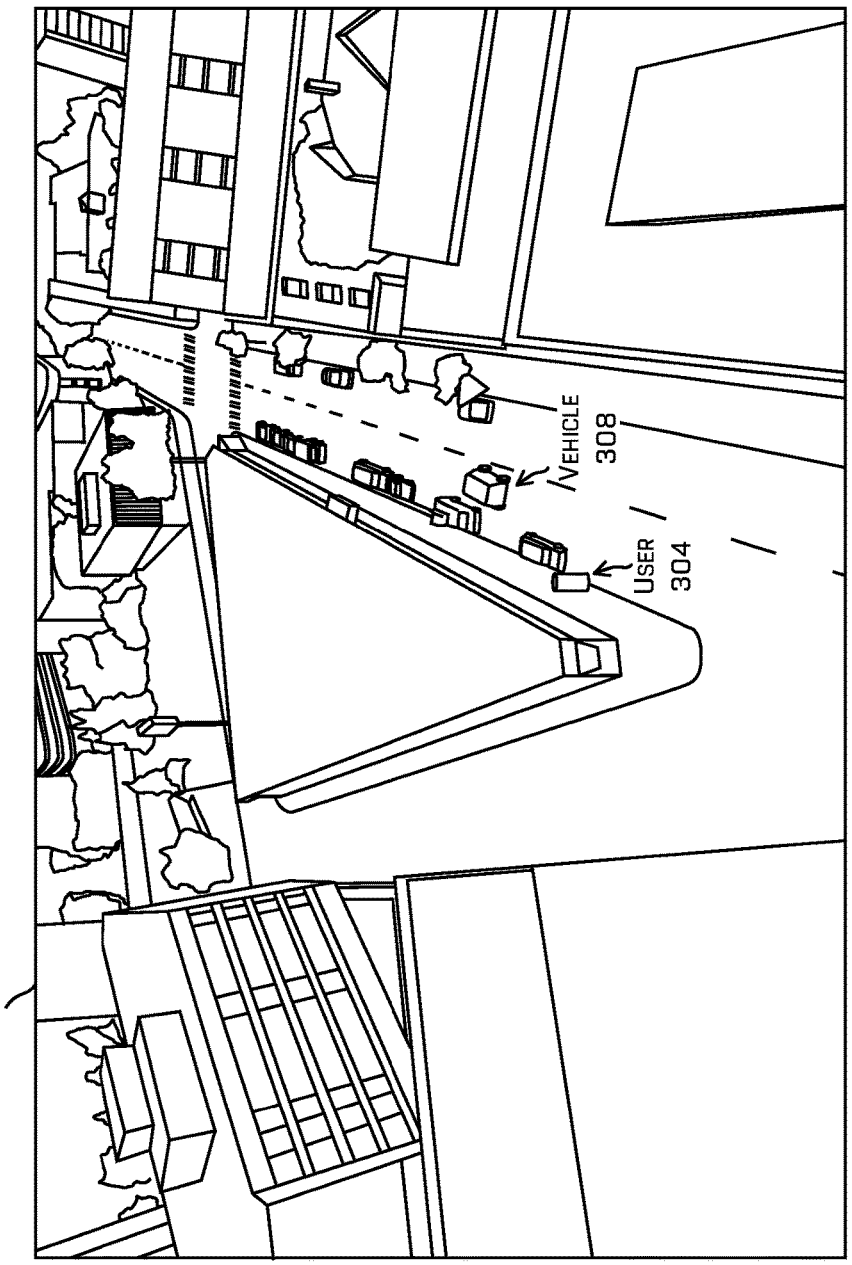
FIG. 4 is an example user interface of a perspective view for identifying vehicles and persons, in accordance with embodiments of the disclosure.

FIG. 4 is an example user interface 400 of a perspective view 402 for identifying vehicles and persons, in accordance with embodiments of the disclosure. In some examples, the perspective view 402 can represent a perspective view (e.g., a virtual perspective, a computer-generated perspective, or a viewing perspective) of the vehicle 308 as it approaches a pickup location associated with the user 304. In some instances, the perspective view 402 can be considered to be a rendering generated by a vehicle or computing device in accordance with the techniques discussed herein. In some instances, the user interface 400 can be presented via the user device 306 in response to a request from the user 304, as discussed above with respect to FIG. 3. In some instances, the perspective view 402 can represent a semi-photorealistic or photorealistic view of the environment. The perspective view 402 can represent details of the objects in the environment, such as doors, windows, vehicles, plants, signs, etc. In some instances, the perspective view 402 can include a representation of the pickup location and/or any augmented reality elements (e.g., breadcrumbs, motion directives, ride information, colors, representations of a vehicle or person, etc., as discussed herein). In some instances, the perspective view 402 can be based at least in part on a three-dimensional map of the environment used by the vehicle 308 to localize the vehicle 308 in the environment. In at least some examples, localization of the user device 306 may be performed relative to the map based on, for example, image data, GPS data, magnetometer data, and the like. As described in detail below, the user 304 can alter perspectives (e.g., the user can select any virtual perspective or computer-generated perspective) to more easily determine the relative locations of the user 304 as compared to the vehicle 308, as well as any surrounding environmental cues (e.g., buildings as landmarks, streets, and the like). As such, as shown in FIG. 4, a rendering of the user 304 (e.g., image data, a virtual representation, and/or a computer generated representation) may be displayed based on the localization and selected perspective. In some instances, the perspective view 402 can be generated by the vehicle 308 and sent to the user device 306 for presentation. In some instances, a virtual perspective can be selected to ensure the user 304, the vehicle 308, a pickup location, and the like, is represented by the virtual perspective (e.g., in the rendering). As illustrated, the vehicle 308 can be represented in the user interface 400 from any perspective to show the position and/or orientation of the vehicle 308 in the context of the user interface 400.

Figure 5:
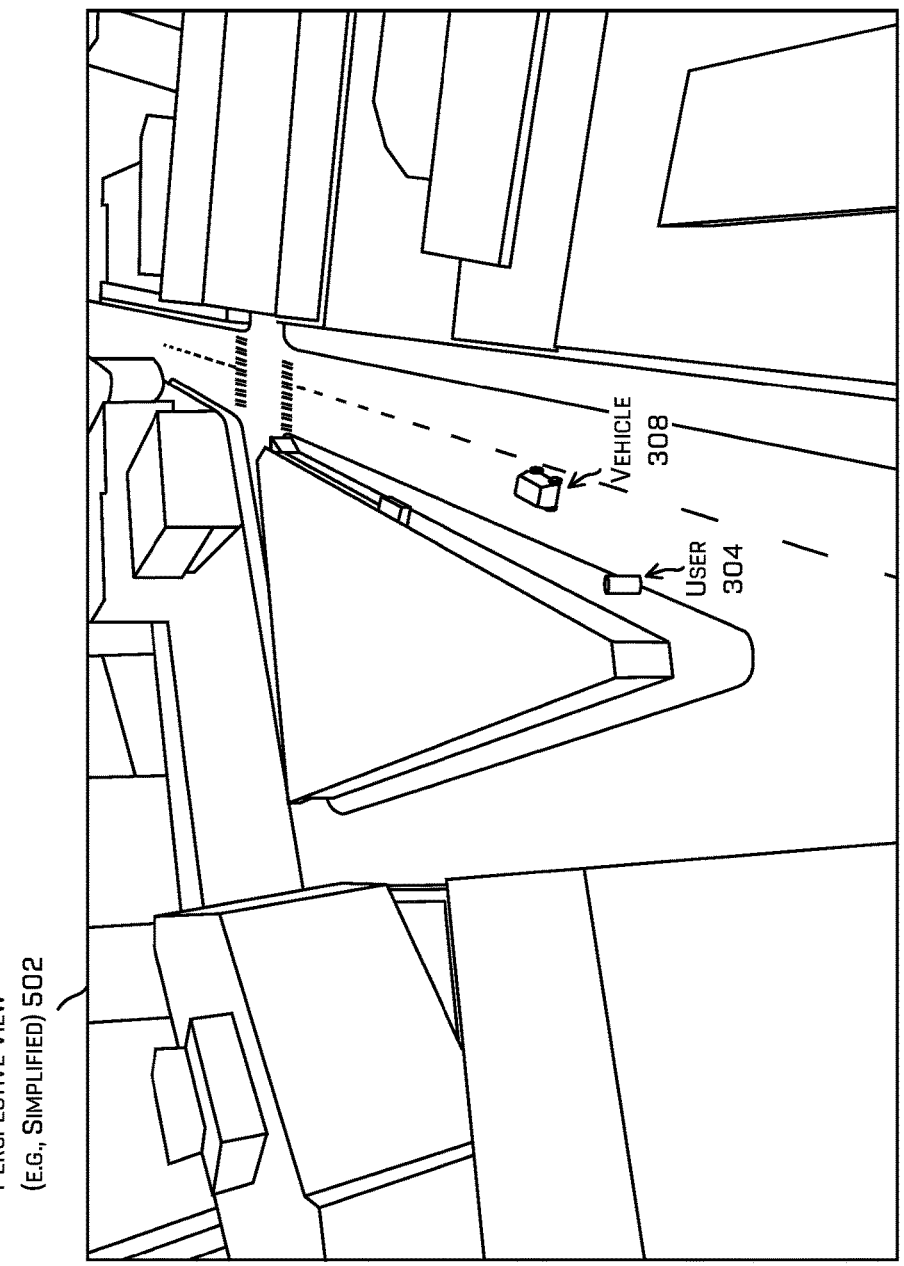
FIG. 5 is an example user interface of another perspective view for identifying vehicles and persons, in accordance with embodiments of the disclosure.

FIG. 5 is an example user interface 500 of another perspective view 502 for identifying vehicles and persons, in accordance with embodiments of the disclosure. In some examples, the perspective view 502 can represent a perspective view of the vehicle 308 as it approaches a pickup location associated with the user 304. In some instances, the user interface 500 can be presented via the user device 306 in response to a request from the user 304, as discussed above with respect to FIG. 3. In some instances, the perspective view 502 can represent a simplified or stylized view of the environment. For example, the perspective view 502 can represent an environment with details abstracted or simplified to emphasize the vehicle 308 and/or the user 304. In some instances, the perspective view 502 can be based at least in part on a three-dimensional map of the environment used by the vehicle 308 to localize the vehicle 308 in the environment. Further, as described in detail below, the user 304 can alter the perspective by various interactions (gesture/touch/buttons) with the user device 306. The user 304 and/or the vehicle 308 may be rendered in the scene according to localization of the user device 306 on the map and the selected perspective. In some instances, the perspective view 502 can be generated by the vehicle 308 and sent to the user device 306 for presentation.

In some instances, the user 304 can manipulate or interact with the perspective views 402 and 502 to pan, rotate, zoom, or otherwise choose any number of perspectives of the environment. For example, the user 304 can interact with the perspective views 402 and 502 via the user interface 256 of the user device 246 (e.g., by touch, gestures, buttons, prepopulated perspectives, and the like). In some instances, the perspective views 402 and 502 can include any annotations, information, augmented reality elements, and the like, to facilitate an identification of the vehicles, users, objects, paths, etc., as discussed herein. In some instances, the perspective views 402 and 502 can be updated in real time to reflect updated positions of user(s), vehicle(s), pickup location(s), and the like.

Figure 6:
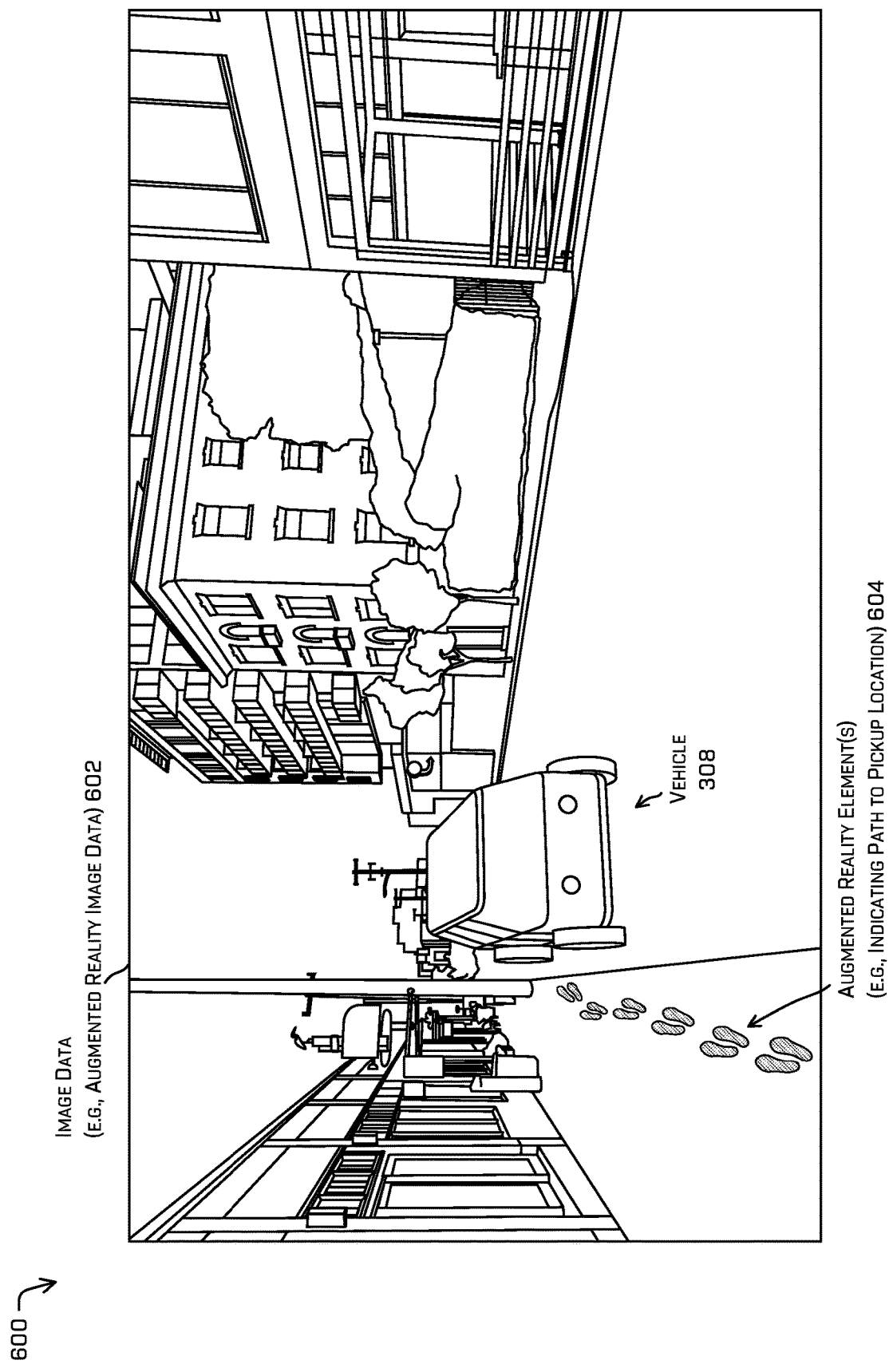
FIG. 6 is an example user interface including augmented reality elements for identifying a path to a pickup location, in accordance with embodiments of the disclosure.

FIG. 6 is an example user interface 600 including image data 602 (e.g., image data captured by the user device 306) and one or more augmented reality elements 604 (also referred to as one or more virtual elements or one or more computer-generated elements) for identifying a path to a pickup location, in accordance with embodiments of the disclosure. For example, the augmented reality elements 604 can include, but are not limited to, breadcrumbs, footsteps, tracks, arrows, rulers, or any elements to show a path between a location associated with a user device (e.g., capturing the image data 602) and a vehicle (e.g., the vehicle 308 dispatched to pick up a user associated with the user device (e.g., the user device 306)). In some instances, the augmented reality elements 604 can include text indicating a distance between a location of the user and the vehicle 308. In some instances, the augmented reality elements 604 can include a representation of the pickup location. In some instances, the augmented reality elements 604 can be based at least in part on sensor data received from the vehicle 308, including but not limited to, LIDAR data, radar data, image data, etc. (e.g., indicating a distance between the user 304 and the vehicle 308, a height of the user device 306 above the ground), map data and/or localization of a user device 306 with respect to the map and/or sensor data. The sensor data can be received by the user device 246 and used to generate more accurate augmented reality elements 604 by incorporating distance and/or height measurements into the element generation. Further, the augmented reality elements 604 can also be based at least in part on location information sent by the vehicle 308, for example, indicating a pickup location associated with the user 304. As above, such augmentation of image data 602 can be performed on any one or more of a computing system of the vehicle 308, the user device 306, or any intermediary device (e.g. computing device 236).

Figure 7:
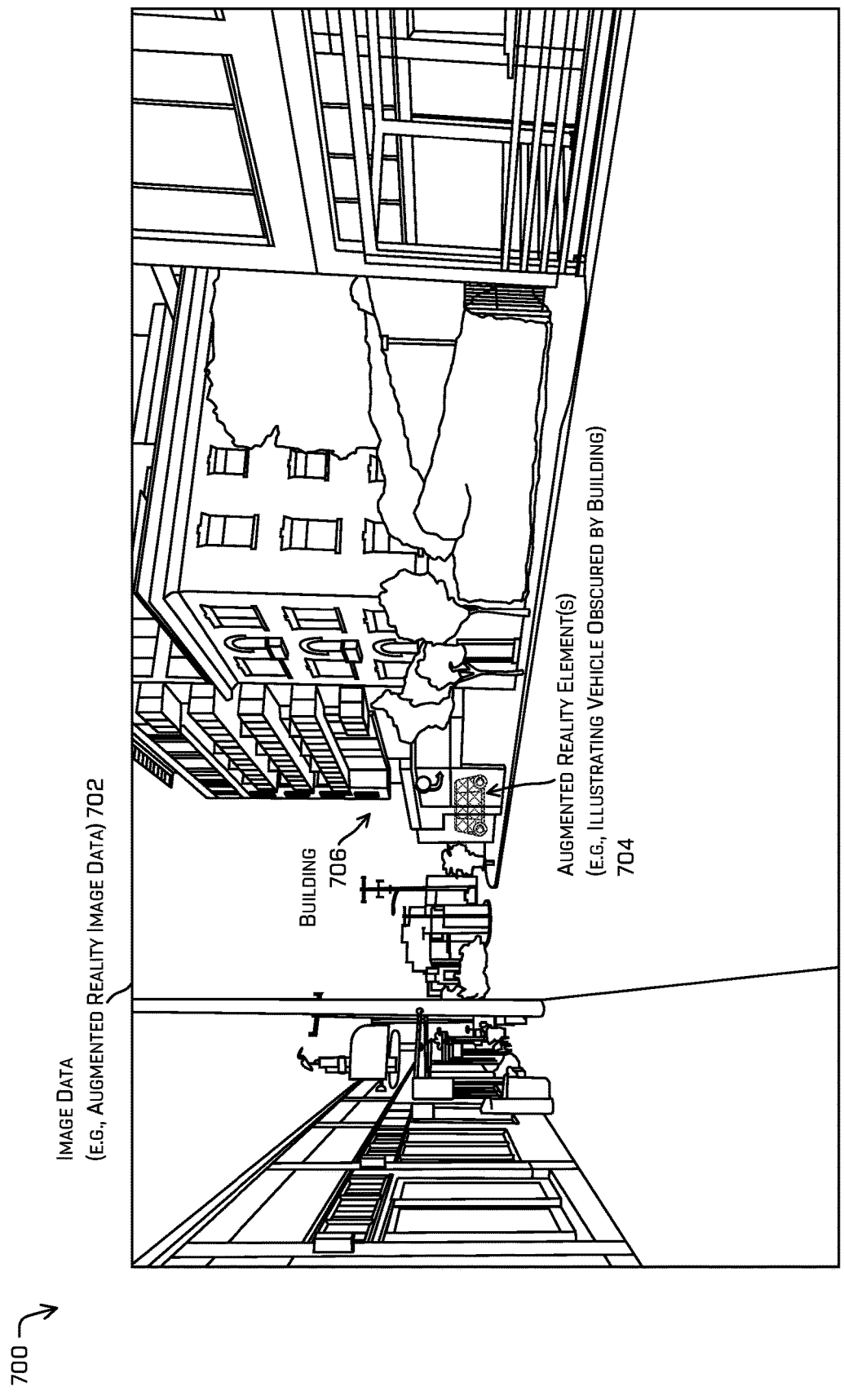
FIG. 7 is an example user interface including augmented reality elements for identifying a vehicle at least partially obscured by another object, in accordance with embodiments of the disclosure.

FIG. 7 is an example user interface 700 including image data 702 (e.g., image data captured by the user device 306) and one or more augmented reality elements 704 for identifying a vehicle at least partially obscured by another object (e.g., a building 706), in accordance with embodiments of the disclosure. In some instances, the augmented reality element 704 can indicate a pose of the vehicle (e.g., as a three-dimensional representation of the vehicle), and in some instances, the augmented reality element 704 can represent the vehicle as a two-dimensional element. In some instances, the augmented reality element 704 can represent a portion of a vehicle that is obscured, while an unobscured portion of a vehicle can be represented by captured image data. For example, the user interface 700 can be used to locate a vehicle (or any object or location) that is not visible to the user device because of one or more obstructions. The augmented reality elements 704 can be based at least in part on location data of the vehicle received by the user device 306. For example, a vehicle to be represented by the augmented reality elements can send location data to the user device 306 so that the augmented reality element can accurately represent a position, orientation, velocity, etc. of the vehicle. Further, the graphic to be presented as the augmented reality element 704 can be received from a remote device, or can be stored on the user device 306. Additional augmented reality elements 704 can include, but are not limited to, time and/or distance indications representing a time until a vehicle is scheduled to arrive at a pickup location or a distance between the user device and the vehicle, or the between the pickup location and the vehicle. In one example, localization of the user device 306 (e.g., determination of a position and/or orientation) can be performed based on image data 702, IMU data, magnetometer data, and/or GPS data from the user device 306. In another example, accurate localization of the user device 306 may not be necessary, requiring only a rough orientation and location. In such an example, a GPS signal, magnetometer, and/or IMU signals may be sufficient to give a coarse enough location and heading of the user device 306 to render the augmented reality elements 704 in the image data 702. Of course, additional augmented reality elements are contemplated herein, and are not limited to those illustrated in the figures.

Figure 8:
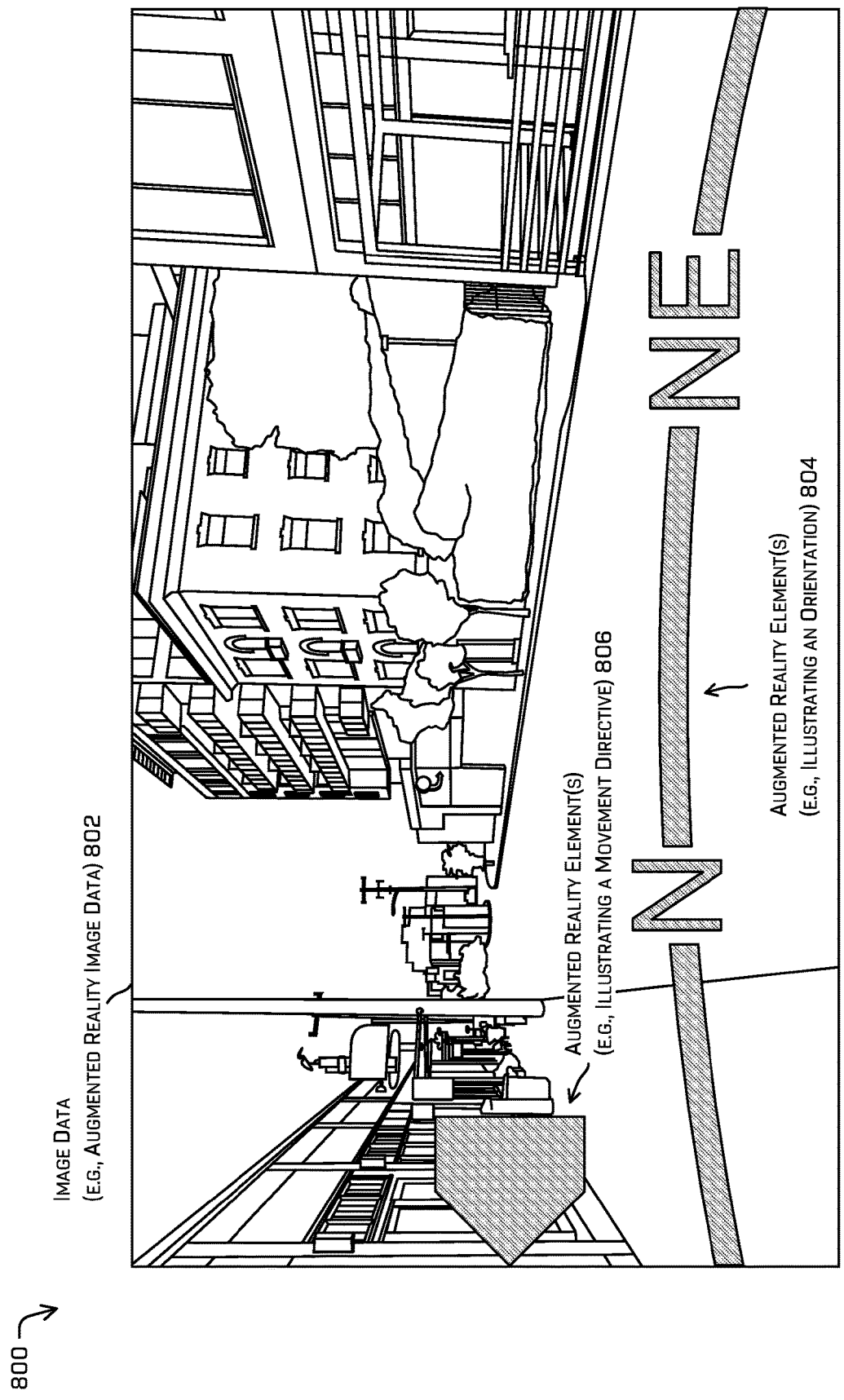
FIG. 8 is an example user interface including augmented reality elements for orienting a user device and for providing a directive to change an orientation of the user device, in accordance with embodiments of the disclosure.

FIG. 8 is an example user interface 800 including image data 802 and one or more augmented reality elements 804 for orienting a user device and for providing a directive 806 (e.g., a graphic directive) to change an orientation of the user device, in accordance with embodiments of the disclosure. For example, the augmented reality elements 804 and 806 can be based at least in part on an orientation of the user device (e.g., the user device 306) and one or more locations of other objects with respect to the user device 306. In some instances, the relative position and/or orientation of the user device 306 can be determined coarsely via a compass, magnetometer, GPS data, etc., at the user device 306. In some instances, various other localization techniques may be employed to provide a position and/or orientation of the user device 306. In some instances, a location of an object can be received by the user device 306 and the augmented reality element 806 can be generated to illustrate a direction in which the user device 306 can be oriented in a direction of the location of the object. For example, if the object is a building, the movement directive 806 can illustrate an orientation of the user device 306 for the user device 306 to capture image data representing the building. In some instances, the object can be a vehicle or a pickup location. However, it can be understood that the augmented reality element 806 can be based on any object, and is not limited to those expressly discussed herein. In some instances, the user interface 800 can represent a field of view captured by a user device (e.g., the user device 246).

Figure 9:
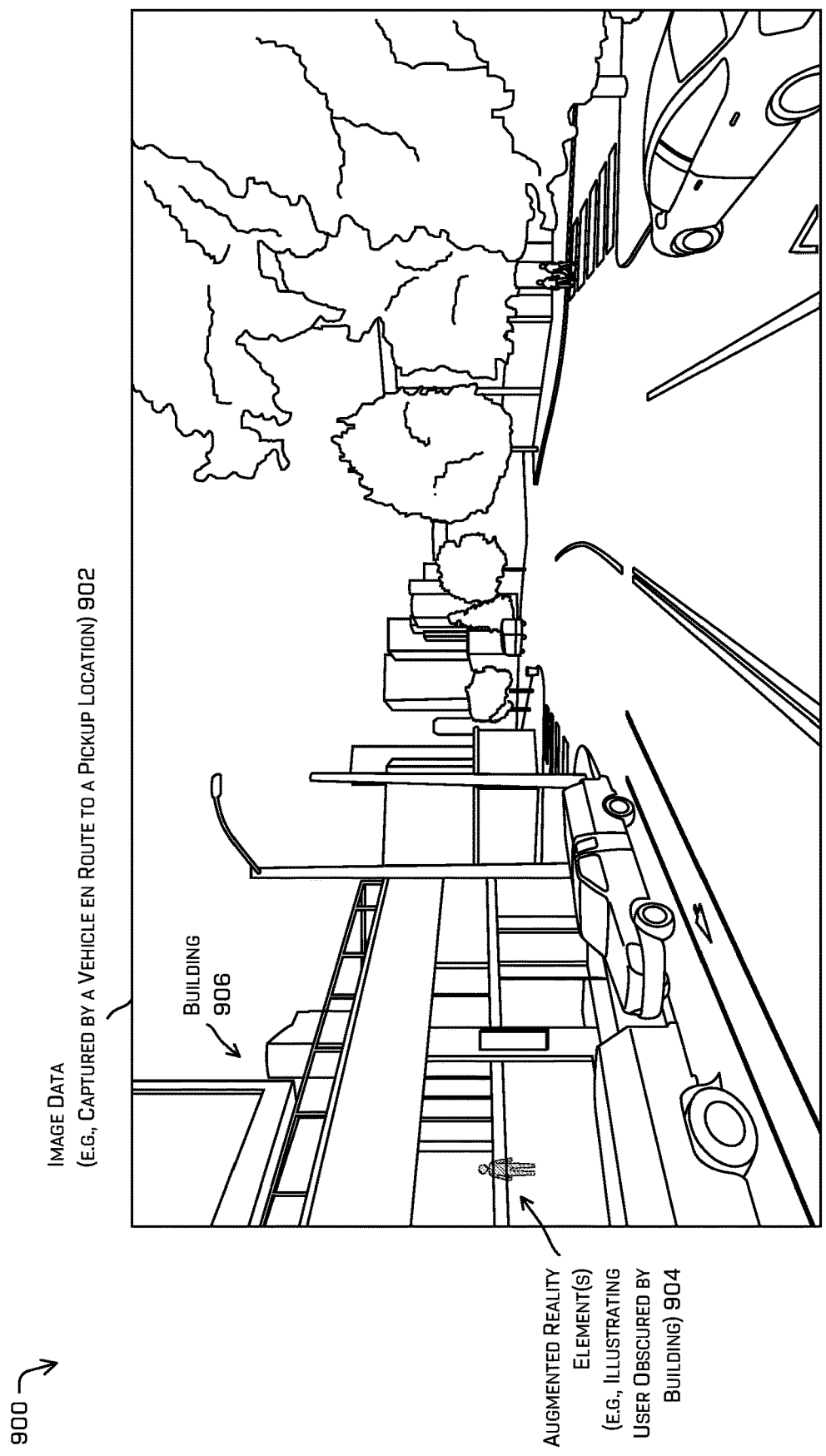
FIG. 9 is an example user interface illustrating image data captured by a vehicle en route to pick up a user, which optionally includes augmented reality elements, in accordance with embodiments of the disclosure.

FIG. 9 is an example user interface 900 illustrating image data 902 captured by a vehicle en route to pick up a user, which may or may not include augmented reality elements 904, in accordance with embodiments of the disclosure. For example, the image data 902 can be captured by one or more image sensors on the vehicle as the vehicle approaches a pickup location of the user. In some instances, the image data 902 can represent a video of the "last mile" traveled by the vehicle, although any distance or time of image data can be used. As discussed herein, in some instances, a building 906 can obscure an object of interest, such as the user 304 to be picked up by the vehicle. In some instances, the augmented reality element 904 can be based at least in part on location data received by a user device associated with a user, and can indicate a direction and/or distance of the user relative to the vehicle. In some instances, the image data 902 can be provided to a user device (e.g., the user device 306) upon request by the user device 306.

Figure 10:
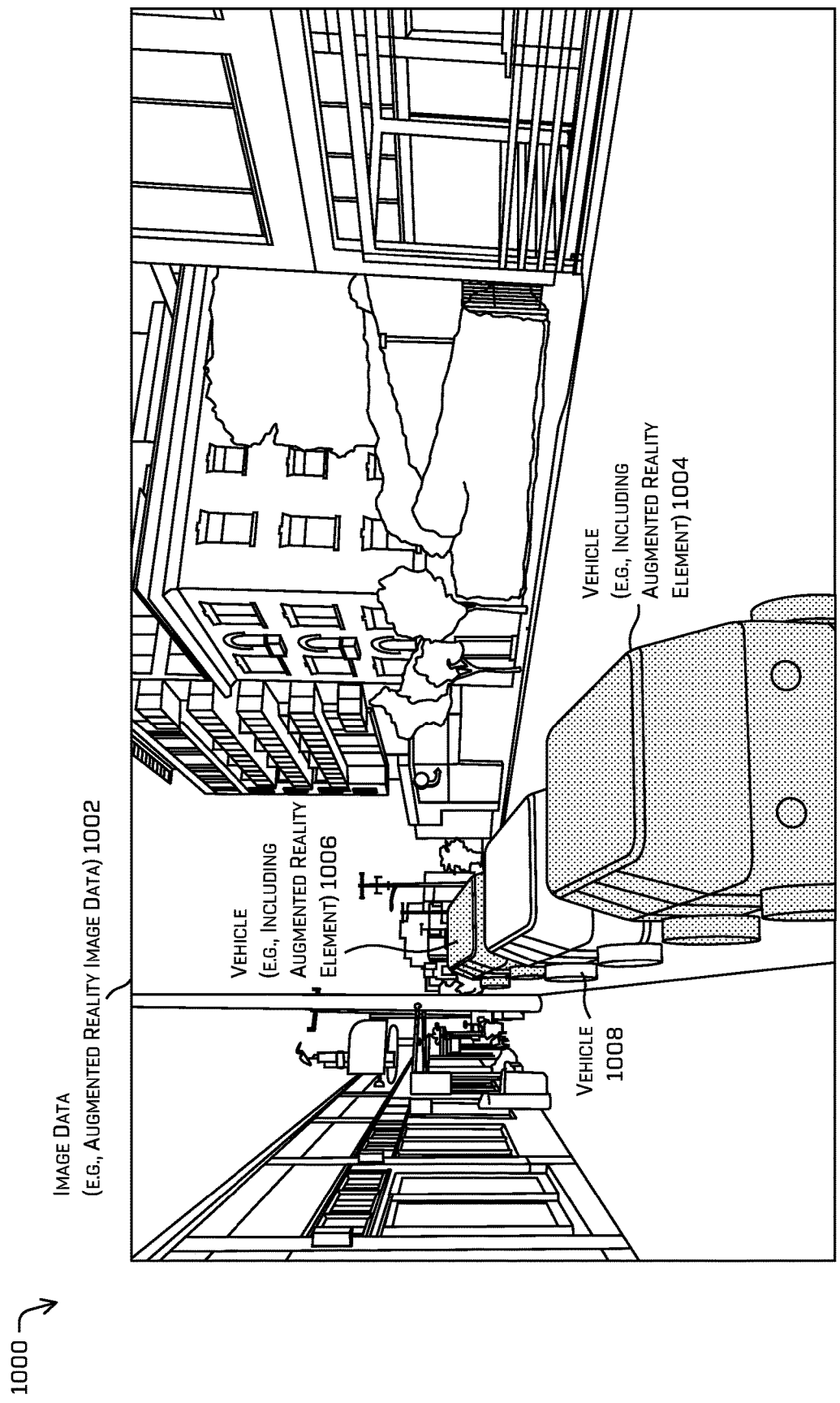
FIG. 10 is an example user interface including augmented reality elements for identifying a vehicle hailed to pick up a passenger, in accordance with embodiments of the disclosure.

FIG. 10 is an example user interface 1000 including image data 1002 and one or more augmented reality elements 1004 and 1006 for identifying a vehicle 1008 hailed to pick up a passenger, in accordance with embodiments of the disclosure. In one example, a user can be at a crowded location, such as an airport. There can be multiple vehicles lined up to pick up passengers, which can lead to delay, confusion, or the wrong passenger getting into the wrong vehicle. As illustrated, the image data 1002 can include augmented reality elements 1004 and 1006 to obscure or deemphasize the vehicles that have not been dispatched to pick up a passenger associated with a user device capturing the image data 1002. In another example, an augmented reality element can be used to highlight (e.g., an overlay of a unique color over the vehicle, etc.) or emphasize (e.g., a silhouette of the vehicle, etc.) the vehicle 1008 to indicate that the user has found the vehicle that has been dispatched to pick up the user associated with the user device capturing the image data 1002. It can be understood that any of the examples of augmented reality elements discussed herein can be used in combination. For example, an augmented reality element (e.g., footsteps) can be used to indicate a path to a vehicle (e.g., the vehicle 1008) that is highlighted to indicate the correct vehicle to the user. These and other examples are considered within the scope of this disclosure. For example, augmented reality elements can be used to indicate time, distances, temperature, buildings, landmarks, pickup locations, drop off locations, vehicles, persons, fictional characters, games, toys, and the like.

Figure 11:
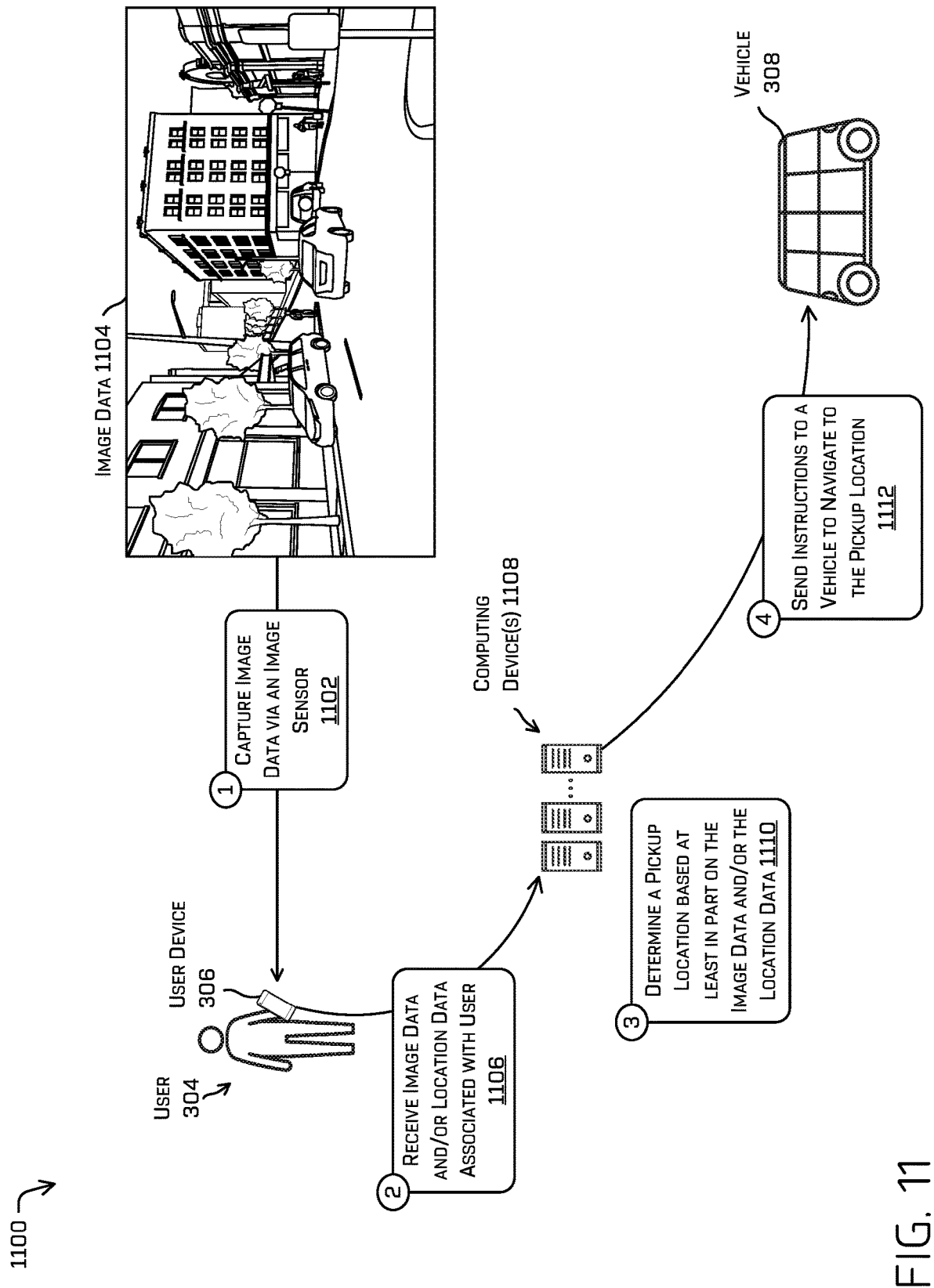
FIG. 11 is a pictorial flow diagram of an example process for determining a pickup location based at least in part on image data captured by a user device in an environment, in accordance with embodiments of the disclosure.

FIG. 11 is a pictorial flow diagram of an example process 1100 for determining a pickup location based at least in part on image data captured by a user device in an environment, in accordance with embodiments of the disclosure. For example, some or all of the process 1100 can be performed by one or more components in FIG. 2, as described herein.

At operation 1102, the process can include capturing image data via an image sensor. For example, image data 1104 can be captured by an image sensor included in the user device 306.

At operation 1106, the process can include receiving image data and/or location data associated with a user (e.g., the user 304 associated with the user device 306). For example, the image data received in the operation 1106 can correspond to the image data 1104 captured in the operation 1102. Further, the location data received in the operation 1106 can include GPS location data, for example, captured by the user device 306. In some instances, the image data and/or location data can be received at a computing device 1108, which can correspond to the computing device(s) 236 of FIG. 2. In some instances, a vehicle (e.g., the vehicle 308) can receive the image data and/or location data, as discussed herein.

At operation 1110, the process can include determining a pickup location based at least in part on the image data and/or the location data. By way of example, the computing device 1108 determine a location to dispatch the vehicle 308 based at least in part on the location data received from the user device 306. Upon determining the location, the operation 1110 can use the image data 1104 received in the operation 1106 to determine a specific pickup location associated with the location. For example, the operation 1110 can include matching features identified in the image data 1104 with features identified in previously received data (e.g., stored as the map(s) 228). In some instances, the operation 1110 can include using one or more algorithms, including but not limited to Harris Corner detector, scale invariant feature transform (SIFT) (and derivatives, such as, but not limited to speeded up robust features (SURF)), features from accelerated segment test (FAST), binary robust independent elementary features (BRIEF), oriented FAST and rotated BRIEF (ORB), bag of words, maximally stable extremal regions (MSER) (and derivatives), and the like. Such vision feature-based localization can be augmented, in some examples, by incorporating other information available to the user device 306, such as GPS coordinates from a GPS sensor, magnetometer measurements, and the like.

At operation 1112, the process can include sending instructions to a vehicle (e.g., the vehicle 308) to navigate to the pickup location. In some instances, the vehicle 308 can be an autonomous vehicle and the instructions can include one or more waypoints or routes for the vehicle to traverse to arrive at the pickup location.

Figure 12:
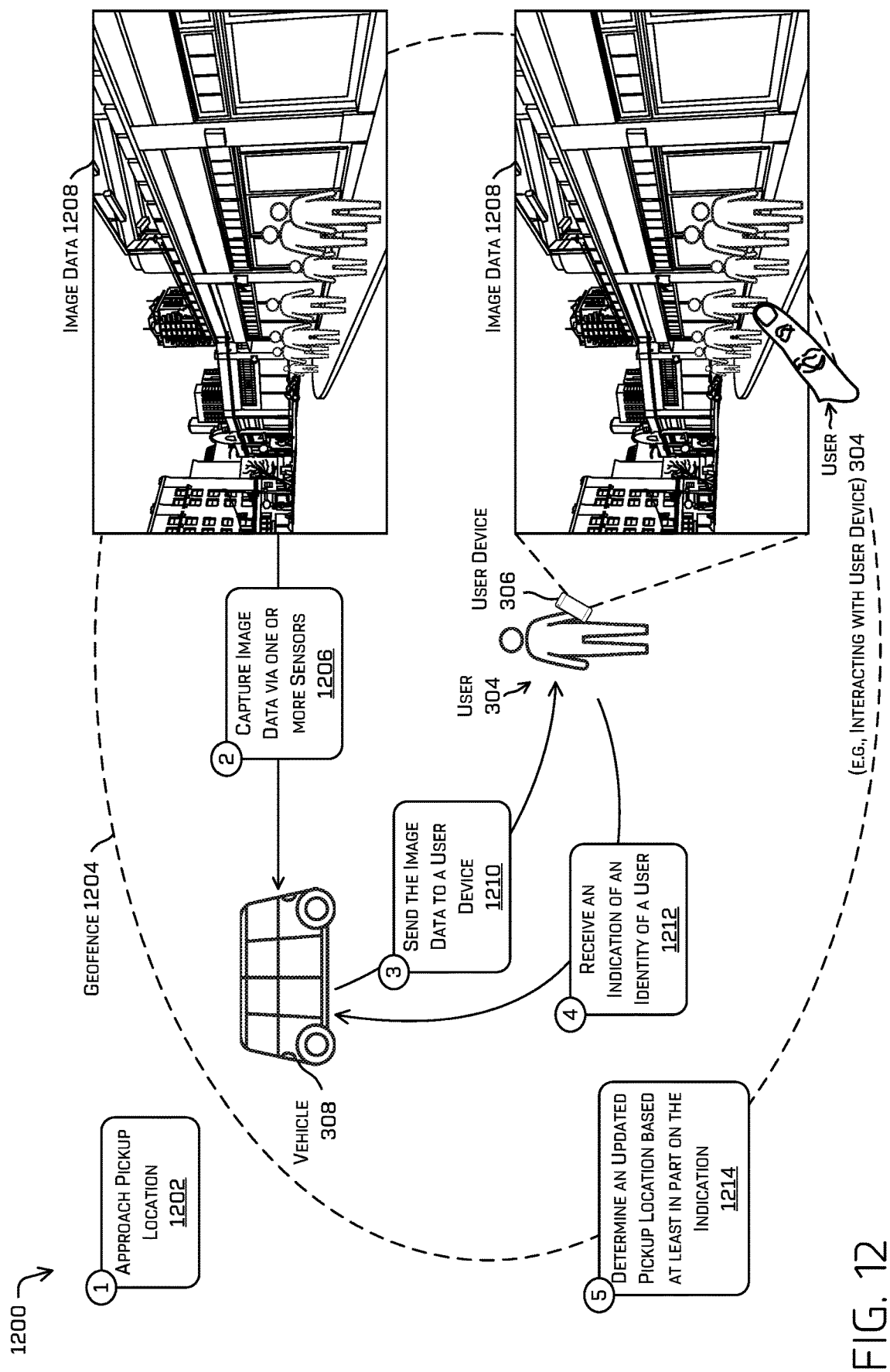
FIG. 12 is a pictorial flow diagram of an example process for determining a user identity by providing image data to a user device and receiving an indication of the user identity, in accordance with embodiments of the disclosure.

FIG. 12 is a pictorial flow diagram of an example process 1200 for determining a user identity by providing image data to a user device and receiving an indication of the user identity, in accordance with embodiments of the disclosure. For example, some or all of the process 1200 can be performed by one or more components in FIG. 2, as described herein.

At operation 1202, the process can include approaching a pickup location. For example, the operation 1202 can include the vehicle 308 traversing an environment to approach a pickup location associated with a ride request. In some instances, the operation 1202 can include determining that the vehicle 308 is within a geofence 1204 associated with the pickup location. In some instances, the operation 1202 can include determining, based on map data, that the vehicle 308 has a line-of-sight to the pickup location.

At operation 1206, the process can include capturing image data (in addition to any other environmental data) via one or more sensors. For example, the vehicle 308 can capture image data 1208 representing one or more persons and/or a pickup location. In some instances, the operation 1206 can include determining that there is at least one person represented in the image data 1208.

At operation 1210, the process can include sending the image data (e.g., the image data 1208) to a user device (e.g., the user device 306). In some examples, the user device 306 can be associated with the user 304 that requested the ride. In some instances, the user 304 can be the intended passenger of the ride, while in some cases, the user 304 may not be the intended passenger. That is, in some instances, a first user can request a ride for a second user that is different than the first user. In some instances, the image data 1208 can be presented on the user device 306 so that the user 304 can identify which person is to be the passenger. As illustrated in FIG. 12, such an identification may be made by selecting the intended passenger with a touch of the finger, though any other method is contemplated (e.g., facial recognition with confirmation via a button, drawing a circle around the intended passenger, receiving a unique visual from a passenger device in image data 1208, and the like). In some instances, the user 304 can designate a region in the image data 1208 that is intended to be a pickup location.

At operation 1212, the process can include receiving an indication of an identity of the user. For example, the operation 1212 can include receiving a confirmation that a user in the image data 1208 is the correct user (e.g., by a button press, verbal confirmation recognized by a natural language processing algorithm, or the like).

At operation 1214, the process can include determining an updated pickup location based at least in part on the indication. For example, for the convenience of the user represented in the image data 1208, the operation 1214 can include updating a pickup location to correspond to the location of the user, to minimize any delay or confusion when the vehicle 308 arrives to pick up the passenger. In some instances, the updated pickup location can be the same as the pickup location.

Figure 13:
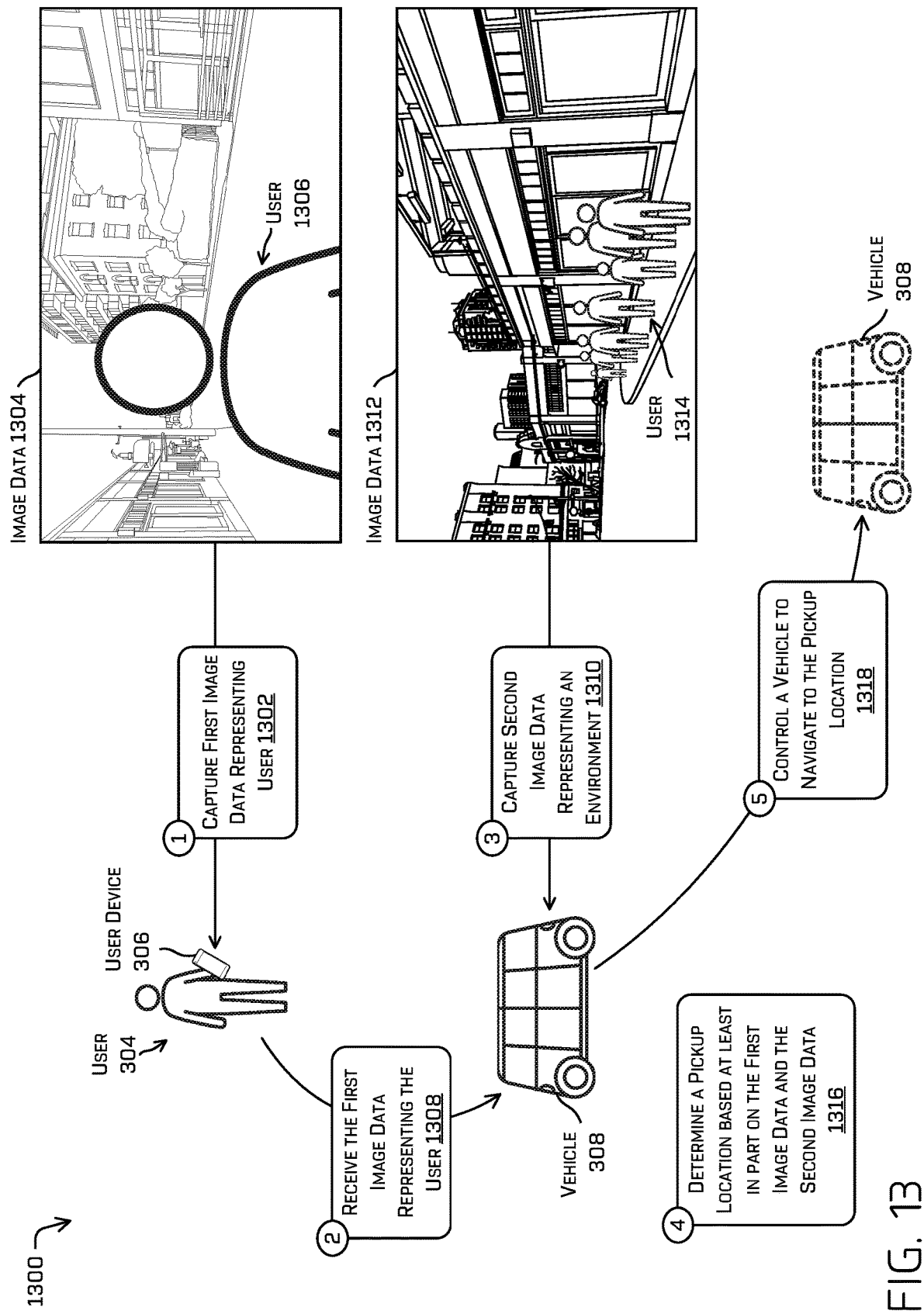
FIG. 13 is a pictorial flow diagram of an example process for identifying a user based on image recognition techniques, in accordance with embodiments of the disclosure.

FIG. 13 is a pictorial flow diagram of an example process 1300 for identifying a user based on image recognition techniques, in accordance with embodiments of the disclosure. For example, some or all of the process 1300 can be performed by one or more components in FIG. 2, as described herein.

At operation 1302, the process can include capturing first image data representing a user. In some instances, the first image data is illustrated as image data 1304 representing a user 1306. In some instances, the user 1306 can correspond to the user 304, although in some cases, the user 1306 can be different than the user 304 (e.g., when the user 1306 requests a ride for another). In some instances, the image data 1304 can be captured by a user device (e.g., the user device 306), while in some instances, the image data 1304 can be captured by the vehicle 308 (e.g., at a time in which an identity of the user in the image data is known). In some instances, the image data 1304 can be received from the internet, such as via a social media profile, a work profile, and the like.

At operation 1308, the process can include receiving the first image data representing the user. In some instances, the first image data can be received along with a request for a ride from a vehicle. In some instances, the first image data 1304 can be received at the vehicle 308 and/or at a computing device (e.g., the computing device(s) 236). In some instances, the operation 1308 can include extracting features of the image data 1304 to determine a profile of the user represented in the image data.

At operation 1310, the process can include capturing image data representing an environment. As illustrated by image data 1312, the image data 1312 captured in the operation 1310 can include a representation of one or more users, including a user 1314.

At operation 1316, the process can include determining a pickup location based at least in part on the first image data and the second image data. For example, the operation 1316 can include performing image recognition on the image data 1312 to determine an identity of the user 1314 represented in the image data 1312. That is, the operation 1316 can include matching one or more features associated with the user 1306 with one or more features associated with the user 1314 to determine that the user 1314 is the user 1306. In some instances, the operation 1316 can include determining that the vehicle 308 has been dispatched to pick up the user 1314.

At operation 1318, the process can include controlling a vehicle to navigate to the pickup location. In some instances, the vehicle 308 can be an autonomous vehicle and the instructions can include one or more waypoints or routes for the vehicle to traverse to arrive at the pickup location.

Figure 14:
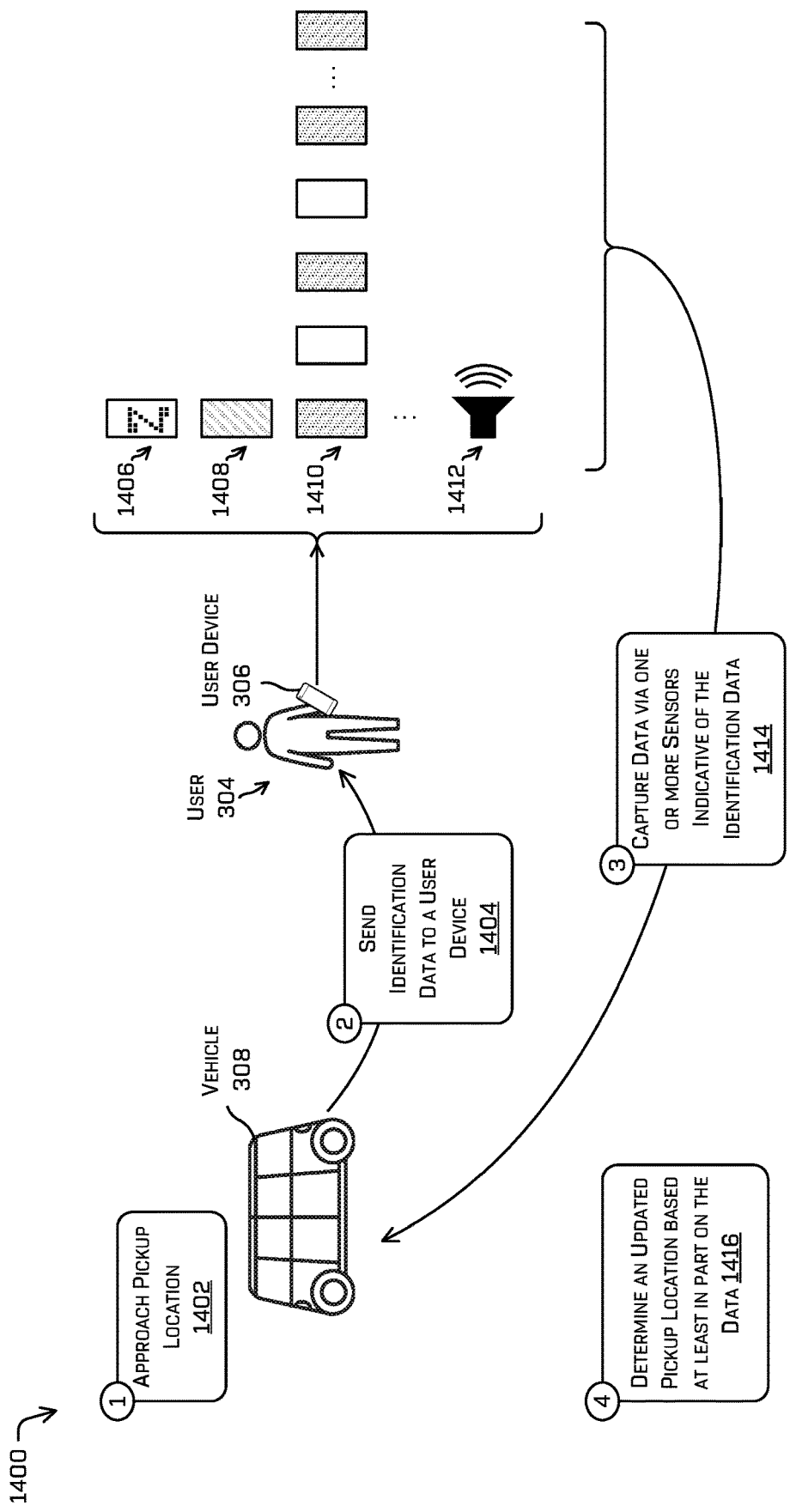
FIG. 14 is a pictorial flow diagram of an example process for identifying a user based on capturing identification data in an environment, in accordance with embodiments of the disclosure.

FIG. 14 is a pictorial flow diagram of an example process 1400 for identifying a user based on capturing identification data in an environment, in accordance with embodiments of the disclosure. For example, some or all of the process 1400 can be performed by one or more components in FIG. 2, as described herein.

At operation 1402, the process can include approaching a pickup location. In some instances, the operation 1402 can include determining that a number of persons proximate to the pickup location meets or exceeds a threshold number (e.g., that there is a crowd present). In some instances, the operation 1402 can include determining that user identity information is not available via image recognition operations (e.g., as discussed above in FIG. 13).

At operation 1404, the process can include sending identification data to a user device. For example, the operation 1404 can include sending instructions to present content via a user device (e.g., the user device 306) or can include sending the content. By way of example, and without limitation, the identification data can include any representations presentable by the user device 306 for the purposes of identifying the user 304. An example 1406 illustrates a unique code that can be presented via a display of the user device 306, such as a QR code, a barcode, an image, etc. An example 1408 illustrates a color or image presentable by the user device 306. An example 1410 illustrates a sequence or pattern of images, colors, lights, etc. presented via a display of the user device 306 to identify the user 304. In some instances, the example 1410 pattern can be presented via a display or via a strobe or light of the user device 306. An example 1412 illustrates an audio signal that can be output by the user device 306 to identify the user 304. In some instances, the vehicle 308 can emit audio to be captured by a microphone of the user device 306, which can provide an indication of the captured audio to the vehicle 308 to determine if the identification information is present in the captured audio. As above, such visual and/or auditory communication between the user device 306 and the vehicle 308 need not be visible or audible to a human (e.g., such signals may comprise infrared light, ultraviolet light, subsonic tones, and/or ultrasonic tones, and the like). In some instances, the identification data can include instructions to the user 304 for the user to make a gesture (e.g., raising one or both arms, jumping up and down, walk towards the vehicle, and the like).

As mentioned above, in some instances, the identification data can already be associated with the user device 306, such that the content itself does need to be sent in the operation 1404, and instead, the operation 1404 can include sending an instruction to begin the presentation of the identification data.

At operation 1414, the process can include capturing data via one or more sensors indicative of the identification data. For example, the vehicle 308 can include image sensors and/or audio sensors to capture data of the environment. Further, the operation 1414 can include processing to determine if data captured in the environment corresponds to the identification data to be presented by the user device 306. In some instances, the operation 1414 can include image recognition or audio processing to determine that the data captured corresponds to the identification data.

At operation 1416, the process can include determining an updated pickup location based at least in part on the data. The operation 1416 can include determining a location associated with the identification data, and updating a pickup location to correspond to the location of the user, to minimize any delay or confusion when the vehicle 308 arrives to pick up the passenger. In some instances, the updated pickup location can be the same as the pickup location.

Figure 15:
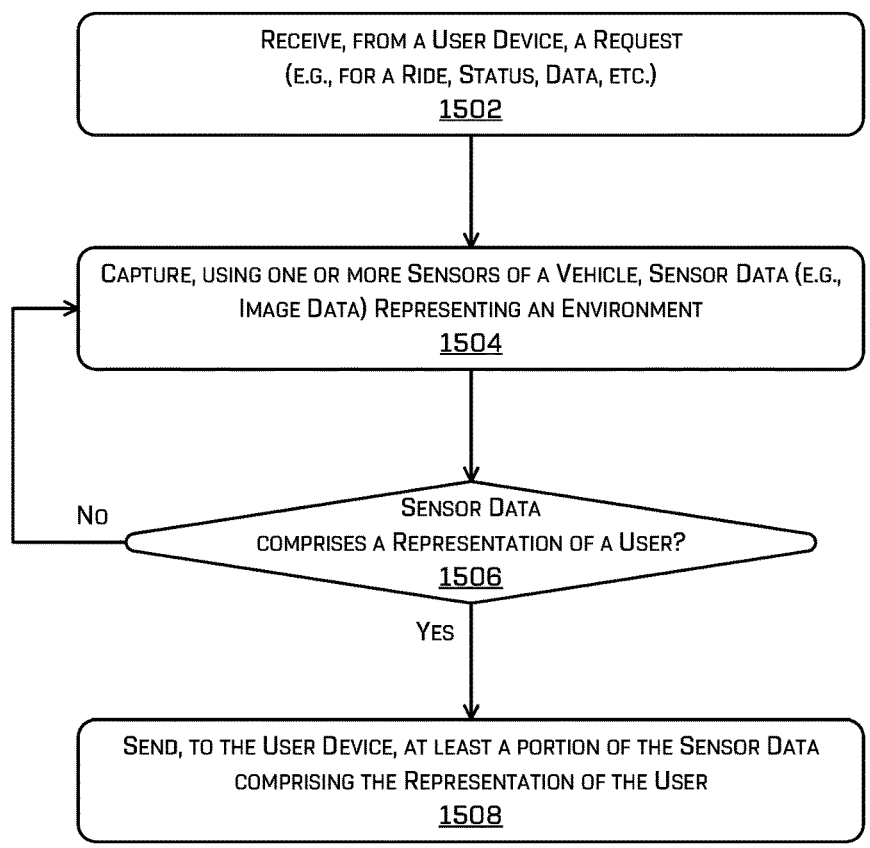
FIG. 15 depicts an example process for capturing image data by a vehicle and providing a portion of the image data to a user device, in accordance with embodiments of the disclosure.

FIG. 15 depicts an example process 1500 for capturing image data (or sensor data, in general) by a vehicle and providing a portion of the image data to a user device, in accordance with embodiments of the disclosure. For example, some or all of the process 1500 can be performed by one or more components in FIG. 2, as described herein. For example, some or all of the process 1500 can be performed by the computing device(s) 204 and/or 236.

At operation 1502, the process can include receiving, from a user device, a request. In some instances, the request can comprise a request for data (e.g., image data). In some instances, the request can comprise a request for a ride (e.g., hailing a vehicle for transportation services), and in some instances, the request can comprise a request for a status (e.g., to check a time and/or distance until a vehicle arrives at a pickup location).

At operation 1504, the process can include capturing, using one or more sensors of a vehicle, sensor data (e.g., image data) representing an environment. In some instance, the operation 1504 can be performed at least partially in response to the request received in the operation 1502. In some instances, the operation can include capturing image data using any number of image sensors in any orientation on the vehicle. In some instances, the operation 1504 can include capturing any data, including but not limited to LIDAR data, radar data, sonar data, and the like.

At operation 1506, the process can include determining whether the sensor data comprises a representation of a user. For example, the operation 1506 can include performing segmentation and/or classification on the image data to determine if a user is represented in the image data. In some instances, the operation 1506 can include determine an identity of the user, in accordance with any of the techniques disclosed herein.

If the image data does not include a representation of a user, the process can return to the operation 1504 to capture additional data. In some instances, if the image data does represent a user (or if the image data does represent the user intended as the passenger), the process continues to operation 1508.

At operation 1508, the process can include sending, to the user device, at least a portion of the sensor data comprising the representation of the user. As illustrated herein, raw or processed sensor data can be provided to the user device. In some instances, the image data can be provided as a panorama or as a composite image (e.g., including image data from two or more images). In some instances, the image data can include image processing such as cropping, color correction, and the like.

Figure 16:
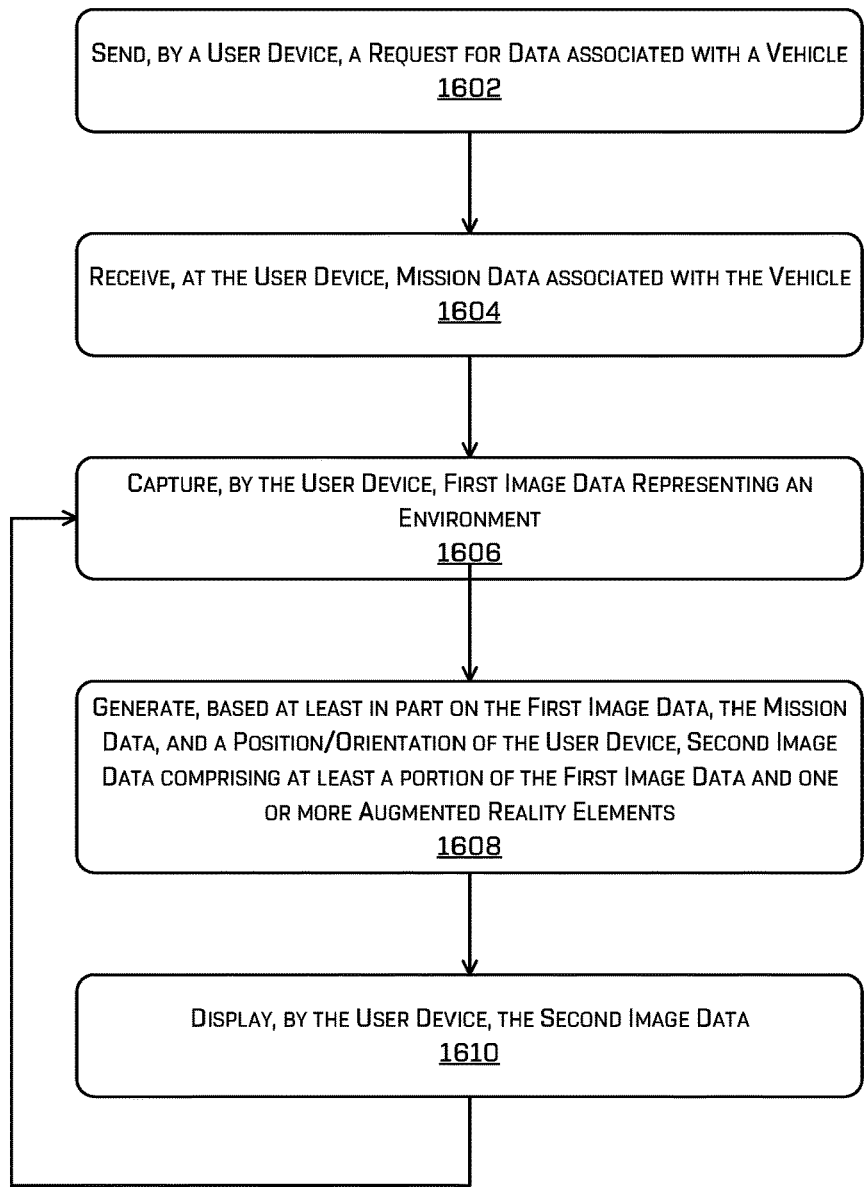
FIG. 16 depicts an example process for generating and presenting image data including augmented reality elements, in accordance with embodiments of the disclosure.

FIG. 16 depicts an example process 1600 for generating and presenting image data including augmented reality elements, in accordance with embodiments of the disclosure. For example, some or all of the process 1600 can be performed by one or more components in FIG. 2, as described herein. For example, some or all of the process 1600 can be performed by the user device(s) 246.

At operation 1602, the process can include sending, by a user device, a request for data associated with a vehicle. In some instances, the request can be based at least in part on an application opening on the user device to generate one or more augmented reality elements for display.

At operation 1604, the process can include receiving, at the user device, mission data associated with the vehicle. In some instances, the mission data can include, but is not limited to, one or more of: sensor data or route data (e.g., a location of the vehicle, a speed of the vehicle, a pose of the vehicle, an estimated time of arrival, a pickup location associated with a trip, an expected path of the vehicle, and the like). In some instances, the mission data can include indications of one or more buildings or landmarks to highlight. In some instances, the mission data can include one or more shape models associated with an object to be subject to one or more augmented reality elements.

At operation 1606, the process can include capturing, by the user device, first image data representing an environment. For example, the user device can capture image data using a sensor associated with the user device. Further, the operation 1606 can include capturing location data and/or orientation information associated with the user device.

At operation 1608, the process can include generating, based at least in part on the first image data, the mission data, and the position/orientation of the user device, second image data comprising at least a portion of the first image data and one or more augmented reality elements. Examples of such augmented reality elements are described above in connection with FIGS. 6-10, although any number and/or type of augmented reality elements are contemplated herein. In some instances, the operation 1608 can include determining an orientation of the user device, identifying one or more features in the image data, applying a shape model associated with an object to be represented using augmented reality, and adding image data corresponding to the augmented reality elements.

At operation 1610, the process can include displaying, by the user device, the second image data. In some instances, the generating and the displaying can be done in real-time or near real-time, such that first image data is continuously captured, the second image data including the one or more augmented reality components and at least a portion of the first image is generated, and the second image data is displayed. This continuous operation is illustrated by the operations continuing from the operation 1610 to the operation 1606.

Figure 17:
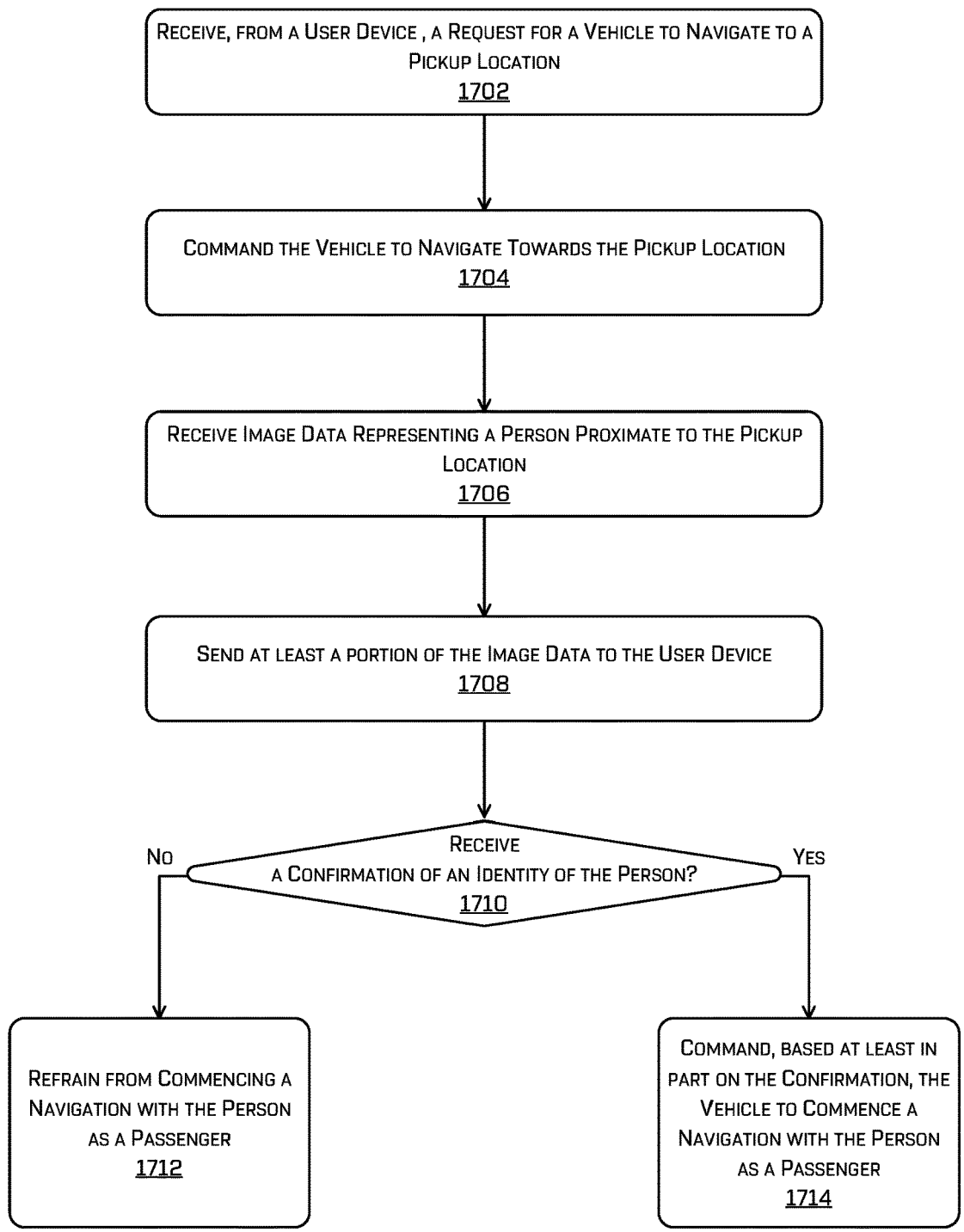
FIG. 17 depicts an example process for capturing image data by a vehicle and providing a portion of the image data to a user device to confirm a user identity, in accordance with embodiments of the disclosure.

FIG. 17 depicts an example process 1700 for capturing image data by a vehicle and providing a portion of the image data to a user device to confirm a user identity, in accordance with embodiments of the disclosure. For example, some or all of the process 1700 can be performed by one or more components in FIG. 2, as described herein. For example, some or all of the process 1700 can be performed by the computing device(s) 204 and/or 236.

At operation 1702, the process can include receiving, from a user device, a request for a vehicle to navigate to a pickup location. For example, the operation 1702 can include receiving a ride request from a user device.

At operation 1704, the process can include commanding the vehicle to navigate towards the pickup location. In some instances, the operation 1704 can include determining a vehicle that is proximate to the user device to minimize a delay to a user associated with the user device.

At operation 1706, the process can include receiving image data representing a person proximate to the pickup location. For example, the operation 1706 can include capturing image data by one or more image sensors on the vehicle, as discussed herein.

At operation 1708, the process can include sending at least a portion of the image data to the user device. For example, the operation 1708 can include cropping at least a portion of the image data. In some instances, the operation 1708 can include determining an initial estimate of the identity of the person represented in the image data. In some instances, person represented in the image data may or may not be the person associated with the user device.

At operation 1710, the process can include determining whether a confirmation of an identity of the person is received. For example, the operation 1710 can include receiving a binary confirmation (e.g., yes/no whether the representation of the person in the image data is to be a passenger) or can include receiving image coordinates corresponding to an identification of a person (e.g., a user of the user device can indicate a location in the image data associated with an intended passenger), or the like. If no confirmation has been received, the process can continue to operation 1712.

At operation 1712, the process can include refraining from commencing a navigation with the person as the passenger. In some instances, if the person has entered the vehicle, the operation 1712 can include providing an indication (e.g., visual, audio, and/or haptic) that the person is not the intended passenger, and asking them to leave the vehicle, for example. In some instances, if the person has not entered the vehicle, the operation 1712 can include refraining from opening a door to the vehicle or unlocking the door to the vehicle.

If a confirmation is received that the person in the image data is the correct person (e.g., that the person is the intended passenger), the process continues to operation 1714.

At operation 1714, the process can include commanding, based at least in part on the confirmation, the vehicle to commence a navigation with the person as the passenger. For example, the operation 1714 can include allowing the person to enter the vehicle (e.g., by automatically opening vehicle door(s)) and starting the trip to a destination. In some instances, the process 1700 can be used to confirm an identity of a third party when the person requesting the ride is not known by the vehicle and/or when the person requesting the ride is not the passenger.

Figure 18:
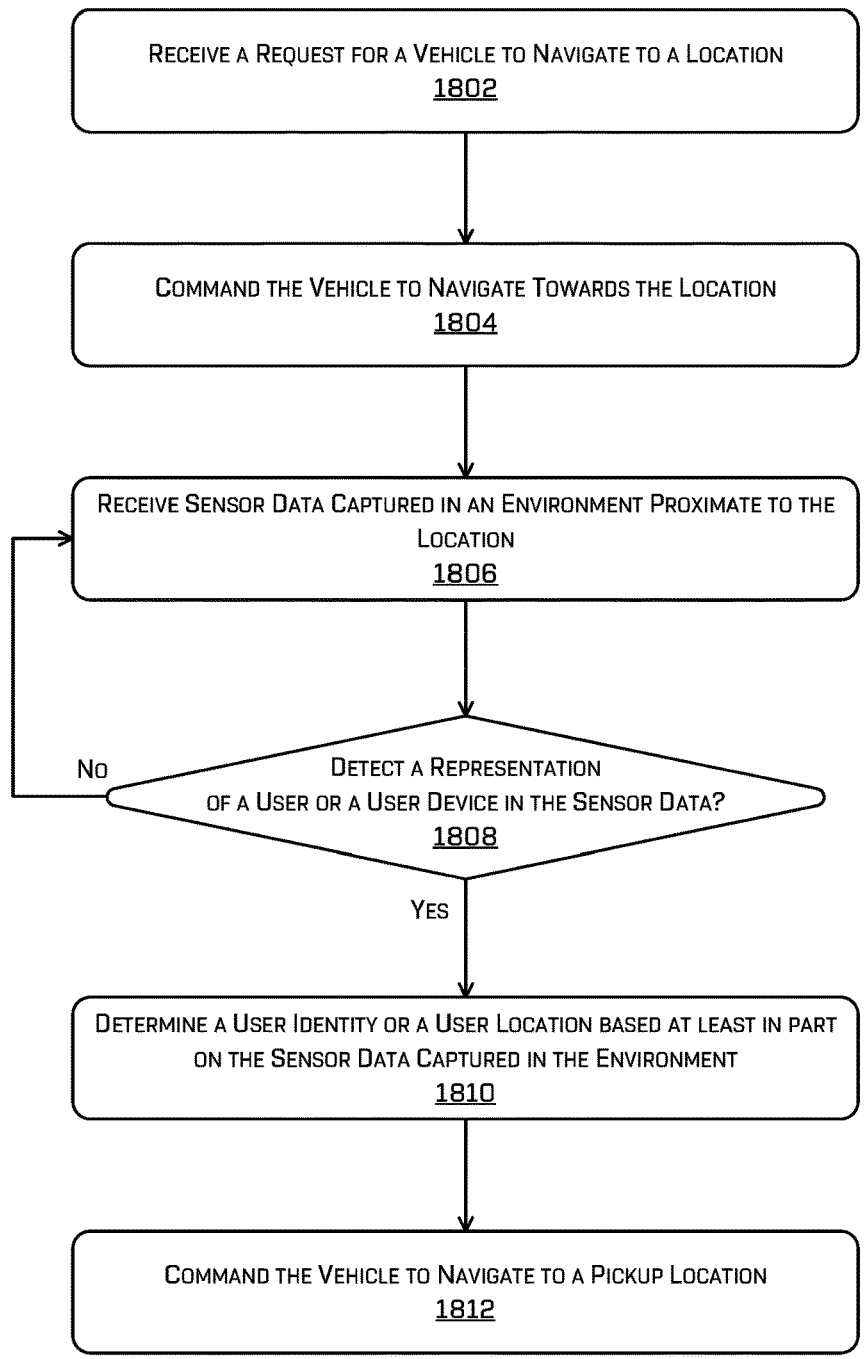
FIG. 18 depicts an example process for capturing sensor data in an environment and for determining a user identity or a user location based on the sensor data, in accordance with embodiments of the disclosure.

FIG. 18 depicts an example process 1800 for capturing sensor data in an environment and for determining a user identity or a user location based on the sensor data, in accordance with embodiments of the disclosure. For example, some or all of the process 1800 can be performed by one or more components in FIG. 2, as described herein. For example, some or all of the process 1800 can be performed by the computing device(s) 204 and/or 236.

At operation 1802, the process can include receiving a request for a vehicle to navigate to a location. For example, the operation 1802 can include receiving a request for a ride from a user device. In some instances, the ride request can be received as an address, and in some instances, the ride request can be received as image data and/or location data, as discussed herein.

At operation 1804, the process can include commanding the vehicle to navigate towards the location. For example, the operation 1804 can include dispatching a vehicle to the location and/or can include following a series of waypoints and/or routes towards the location.

At operation 1806, the process can include receiving sensor data captured in an environment proximate to the location. For example, as the vehicle approaches the location, the vehicle can capture image data, LIDAR data, radar data, sonar data, etc. representing the environment. In another example, as the vehicle approaches the location, the vehicle (and/or a computing device associated with the vehicle) can send identification data and/or instructions to present such identification data via the user device.

At operation 1808, the process can include determining whether a representation of a user or a user device is detected in the sensor data. For example, the operation 1808 can include performing segmentation and/or classification on the sensor data to determine if a user or user device is present (e.g., without determining an identity of the user or the user device), though any other techniques for signal identification are contemplated. If no such representation is determined, the process can return to the operation 1806 to continue to capture sensor data in the environment. If a representation is detected, the process can continue to operation 1810.

At operation 1810, the process can include determining a user identity or a user location based at least in part on the sensor data captured in the environment. For example, the operation 1810 can include sending a portion of the sensor data to a user device for confirmation of an identity of a user (or for confirmation of a location associated with the user) in the sensor data. In some examples, the operation 1810 can include performing image recognition on the sensor data to determine (e.g., based on previously-captured representative data) an identity of the user. In some instances, the operation can include capturing sensor data and determining whether the sensor data corresponds to identification data, as discussed herein.

At operation 1812, the process can include commanding the vehicle to navigate to a pickup location. In some instances, the operation 1812 can include determining a pickup location based at least in part on the sensor data captured herein, and/or based on an indication or confirmation received from a user device.

In this manner, the techniques discussed herein can facilitate the identification of vehicles and persons, as discussed herein.

Example Clauses

A: A system comprising: one or more processors; and one or more computer-readable media storing instructions executable by the one or more processors, wherein the instructions, when executed, cause the system to perform operations comprising: sending, from a user device, a request for data; capturing, using one or more sensors of the user device, first image data representing an environment; receiving, at the user device, sensor data or route data associated with a vehicle; generating, based at least in part on the first image data and the sensor data or the route data, second image data, the second image data comprising a portion of the first image data and a computer-generated element; and causing the user device to display the second image data to the user.

B: The system of paragraph A, wherein the sensor data or the route data comprises a location of the vehicle, and wherein the computer-generated element comprises an indication of an identity of the vehicle in the second image data.

C: The system of paragraph B, wherein the indication of the identity comprises an outlining of the vehicle in the second image data or a color overlay of the vehicle in the second image data.

D: The system of any of paragraphs A-C, the operations further comprising: determining a pickup location associated with the user device; determining a distance between the vehicle and the pickup location; determining that the distance is at or below a threshold distance; and generating the computer-generated element based at least in part on the distance being at or below the threshold distance:

E: The system of any of paragraphs A-D, wherein the vehicle is an autonomous vehicle, and wherein the request further comprises a request to control the autonomous vehicle to navigate to a pickup location.

F: A method comprising: sending, by a user device, a request for data associated with a vehicle; receiving, at the user device, mission data comprising sensor data or route data associated with the vehicle; capturing, by the user device, first image data representing an environment; generating, based at least in part on the first image data and the mission data, second image data comprising at least a portion of the first image data and a computer-generated element; and displaying, by the user device, the second image data.

G: The method of paragraph F, further comprising: receiving, as the mission data, an indication of a pickup location, wherein the computer-generated element indicates a path to the pickup location.

H: The method of paragraph G, further comprising: determining a distance between the user device and the pickup location; determining, based at least in part on the first image data, that the distance is less than or equal to a threshold distance; and sending, by the user device, an indication that the user device is less than or equal to the threshold distance of the pickup location.

I: The method of any of paragraphs F-H, wherein the mission data comprises an indication of a location of the vehicle, the method further comprising: determining that a portion of the first image data represents the vehicle, wherein the computer-generated element indicates an identity of the vehicle.

J: The method of paragraph I, wherein the computer-generated element indicating the identity of the vehicle comprises an overlay of a unique color over the vehicle or a silhouette of the vehicle.

K: The method of any of paragraphs F-J, wherein the mission data comprises an indication of a location of the vehicle, the method further comprising: determining, based at least in part on the location of the vehicle, a position of the user device, and an orientation of the user device, that at least a portion of the vehicle is obscured by an object in the first image data, wherein the computer-generated element comprises a representation of the at least the portion of the vehicle that is obscured by the object.

L: The method of any of paragraphs F-K, wherein the mission data comprises an indication of a location of the vehicle, the method further comprising: determining, based at least in part on the location of the vehicle, the first image data, a position of the user device, and an orientation of the user device, a rotation from the user device to the vehicle, wherein the computer-generated element comprises one or more graphic directives instructing a user to change to the orientation of the user device.

M: The method of any of paragraphs F-L, wherein the mission data comprises second image data acquired by an image sensor on the vehicle and a location of the vehicle, and wherein generating the computer-generated element comprises generating, based at least in part on the location, a position of a user, and an orientation of the user device, an indication of the position of the user in the second image data.

N: The method of any of paragraphs F-M, further comprising: receiving, from the vehicle, data based at least in part on at least one of LIDAR data, radar data captured by the vehicle, or map data; and generating the computer-generated element based at least in part on the data.

O: The method of any of paragraphs F-N, wherein the mission data comprises one or more images captured by an image sensor on the vehicle during a period of time immediately preceding the request, the method further comprising displaying the one or more images via the user device.

P: A non-transitory computer-readable medium storing instructions that, when executed, cause one or more processors to perform operations comprising: sending, by a user device, a request for data associated with a vehicle; receiving, at the user device, mission data comprising sensor data or route data associated with the vehicle; capturing, by the user device, first image data representing an environment; generating, based at least in part on the first image data and the mission data, second image data comprising at least a portion of the first image data and a computer-generated element; and displaying, by the user device, the second image data.

Q: The non-transitory computer-readable medium of paragraph P, the operations further comprising: receiving, as the mission data, an indication of a pickup location; and generating the computer-generated element to indicate a path from a location to the pickup location.

R: The non-transitory computer-readable medium of paragraph P or Q, wherein the mission data comprises an indication of a location of the vehicle, the operations further comprising: determining, based at least in part on the location of the vehicle, a portion of the first image data associated with the vehicle; and generating the computer-generated element to indicate an identity of the vehicle.

S: The non-transitory computer-readable medium of paragraph R, the operations further comprising: determining, based at least in part on the first image data, the location, a position of the user device, and an orientation of the user device, that at least a portion of the vehicle is obscured by an object in the first image data, wherein the computer-generated element to indicate an identity of the vehicle comprises a representation of the portion of the vehicle that is obscured by the object.

T: The non-transitory computer-readable medium of any of paragraphs P-S, wherein the mission data comprises an indication of a location of the vehicle, the operations further comprising: determining, based at least in part on the first image data, the location, a position of the user device and an orientation of the user device, that the vehicle is not within a field of view associated with the user device, wherein the computer-generated element comprises an indication of how to orient the user device such that the vehicle is within the field of view of the user device.

U. A system comprising: one or more processors; and one or more computer-readable media storing instructions executable by the one or more processors, wherein the instructions, when executed, cause the system to perform operations comprising: receiving, from a user device, a request for a vehicle to navigate to a pickup location to pick up a passenger; commanding the vehicle to navigate towards the pickup location; acquiring image data from an image sensor on the vehicle, the image data comprising data representing a person proximate to the pickup location; sending at least a portion of the image data representing the person to the user device; receiving, from the user device, a confirmation that the person is the passenger; and commanding, based at least in part on the confirmation, the vehicle to commence a navigation with the person as the passenger.

V: The system of paragraph U, wherein the user device is associated with the person.

W: The system of paragraph U or V, wherein the person is a first person, and wherein the user device is associated with a second person that is different than the first person.

X: The system of any of paragraphs U-W, the operations further comprising: determining a location of the person; determining, based at least in part on the location, an updated pickup location; and commanding the vehicle to navigate to the updated pickup location.

Y: The system of any of paragraphs U-X, the operations further comprising: commanding the vehicle to provide, to the person, access to the vehicle at least partially in response to receiving the confirmation.

Z: A method comprising: receiving a request for a vehicle to navigate to a location; causing the vehicle to navigate towards the location; receiving sensor data captured by a sensor on the vehicle in an environment proximate to the location; confirming a user identity based at least in part on the sensor data captured in the environment; and causing, based at least in part on the user identity, the vehicle to navigate to a pickup location associated with the location.

AA: The method of paragraph Z, wherein the request comprises image data of the environment captured by a user device, the method further comprising: receiving location data associated with the user device; determining, based at least in part on the location data, the location; and determining the pickup location based at least in part on comparing the image data to a map of the environment.

AB: The method of paragraph Z or AA, wherein the sensor data comprises image data captured by the vehicle, the method further comprising: sending at least a portion of the image data to a user device; receiving, from the user device, an indication associated with the user identity; and determining the pickup location based at least in part on the indication.

AC: The method of paragraph AB, wherein a first user is represented in the image data, and wherein the user device is associated with a second user other than the first user.

AD: The method of paragraph AB or AC, the method further comprising: commanding the vehicle to provide access to the vehicle at least partially in response to receiving the indication.

AE: The method of any of paragraphs Z-AD, wherein the sensor data comprises first image data captured by the vehicle, the method further comprising: receiving second image data comprising a representation of a user; determining, based at least in part on comparing the first image data and the second image data, that the user is represented in the first image data; and confirming the user identity based at least in part on determining that the user is represented in the first image data.

AF: The method of any of paragraphs Z-AE, further comprising: sending, to a user device, identification data to be presented via the user device; receiving, as the sensor data, image data or audio data captured in the environment; determining that the sensor data corresponds to the identification data presented via the user device; and determining the pickup location based at least in part on the sensor data corresponding to the identification data.

AG: The method of paragraph AF, wherein the identification data comprises one or more of: a unique code to be presented via a display of the user device; image data to be presented via the display of the user device; a color to be presented via the display of the user device; a light pattern to be presented via the display of the user device; or audio data to be presented via a speaker of the user device.

AH: The method of any of paragraphs Z-AG, wherein the vehicle is an autonomous vehicle.

AI: A non-transitory computer-readable medium storing instructions that, when executed, cause one or more processors to perform operations comprising: receiving a request for a vehicle to navigate to a location; causing the vehicle to navigate towards the location; receiving sensor data captured in an environment proximate to the vehicle; confirming a user identity based at least in part on the sensor data; and causing, based at least in part on the user identity, the vehicle to navigate to a pickup location associated with the location.

AJ: The non-transitory computer-readable medium of paragraph AI, wherein the request comprises image data of the environment captured by a user device, the operations further comprising: receiving location data associated with the user device; determining, based at least in part on the location data, the location; and determining the pickup location based at least in part on comparing the image data to a map of the environment.

AK: The non-transitory computer-readable medium of paragraph AI or AJ, wherein the sensor data comprises image data captured by the vehicle, the operations further comprising: sending at least a portion of the image data to a user device; receiving, from the user device, an indication associated with the user identity; and determining the pickup location based at least in part on the indication.

AL: The non-transitory computer-readable medium of paragraph AK, the operations further comprising: commanding the vehicle to provide access to the vehicle at least partially in response to receiving the indication.

AM: The non-transitory computer-readable medium of any of paragraphs AI-AL, wherein the sensor data comprises first image data captured by the vehicle, the operations further comprising: requesting, from a social media platform, second image data associated with a profile of a user; receiving, from the social media platform, the second image data comprising a representation of a user; determining, based at least in part on comparing the first image data and the second image data, that the user is represented in the first image data; and determining the user identity based at least in part on determining that the user is represented in the first image data.

AN: The non-transitory computer-readable medium of any of paragraphs AI-AM, the operations further comprising: sending, to a user device, identification data to be presented via the user device; receiving, as the sensor data, image data or audio data captured in the environment; determining that the sensor data corresponds to the identification data presented via the user device; and determining the pickup location based at least in part on the sensor data corresponding to the identification data.

AO. A system comprising: one or more processors; and one or more computer-readable media storing instructions executable by the one or more processors, wherein the instructions, when executed, cause the system to perform operations comprising: receiving, from a user device, a request for data, the request comprising a request for transportation by an autonomous vehicle; capturing, using one or more sensors of the autonomous vehicle, image data representing an environment proximate to a user and the user; sending, to the user device, at least a portion of the image data, wherein the portion of the image data, when viewed by the user, allows the user to locate the autonomous vehicle.

AP: The system of paragraph AO, wherein capturing the image data representing the environment comprises: capturing first image data of the environment using a first image sensor of the autonomous vehicle; capturing second image data of the environment using a second image sensor of the autonomous vehicle; and generating, as the image data, a combined image including at least a portion of the first image data and at least a portion of the second image data.

AQ: The system of paragraph AO or AP, the operations further comprising: determining, based at least in part on the image data or light detection and ranging (LIDAR) data, a position of the autonomous vehicle with respect to a map; and generating, based at least in part on the position of the autonomous vehicle, a computer-generated image comprising a computer-generated representation of the autonomous vehicle and a portion of the map associated with the position, wherein the portion of the image data comprises the computer-generated image.

AR: The system of any of paragraphs AO-AQ, wherein the image data is first image data, and wherein the first image data comprises a first representation of the user, the operations further comprising: receiving, from the user device or a user profile associated with the user device, second image data comprising a second representation of the user; and determining that the first image data comprises the first representation of the user based at least in part on an image recognition algorithm and the second representation of the user.

AS: The system of any of paragraphs AO-AR, wherein the request comprises a request that the autonomous vehicle navigate to a pickup location.

AT: A method comprising: receiving, from a user device, a request for data, the request comprising a request for transportation; receiving, from one or more sensors of a vehicle, sensor data representing an environment; generating, based at least in part on the sensor data, a rendering comprising a representation of a user associated with the user device; and sending, to the user device and based at least in part on the request, the rendering, the rending allowing the user to locate the vehicle.

AU: The method of paragraph AT, further comprising: determining, based at least in part on the sensor data, a vehicle position or vehicle orientation associated with the vehicle in the environment; accessing, based at least in part on the vehicle position, map data associated with the environment; and generating, based at least in part on the map data, the vehicle position or vehicle orientation, and a viewing perspective, the rendering.

AV: The method of paragraph AU, wherein the sensor data comprises image data acquired from a camera on the vehicle, wherein the map data comprises a mesh representation of the environment, and wherein generating the rendering comprises: associating the image data with the mesh representation; and generating, as the rendering, a computer-generated representation of the vehicle on the mesh representation as viewed from the viewing perspective.

AW: The method of paragraph AU or AV, further comprising: receiving a user position from the user device, wherein the rendering further comprises a computer-generated representation of the user associated with the user device at the user position with respect to the map data as viewed from the viewing perspective.

AX: The method of any of paragraphs AU-AW, wherein the request for data comprises the viewing perspective.

AY: The method of any of paragraphs AU-AX, wherein the viewing perspective is a first viewing perspective, the method further comprising: receiving, from the user device, a second viewing perspective, the second viewing perspective differing from the first viewing perspective; generating, based at least in part on the map data, a second rendering comprising a second computer-generated representation of the vehicle with respect to the map data as viewed from the second viewing perspective; and sending, to the user device, the second rendering.

AZ: The method of any of paragraphs AU-AY, wherein the rendering is a first rendering of the environment at a first time, the method further comprising: determining an updated vehicle position or an updated vehicle orientation of the vehicle at a second time; generating, based at least in part on the updated vehicle position or the updated vehicle orientation, a second rendering; and sending, to the user device, the second rendering representing the environment at the second time.

BA: The method of any of paragraphs AT-AZ, further comprising: determining that the sensor data comprises the representation of the user based at least in part on comparing the sensor data with a known representation of the user.

BB: The method of any of paragraphs AT-BA, wherein the sensor data further comprises light detection and ranging (LIDAR) data acquired from a LIDAR device on the vehicle.

BC: The method of any of paragraphs AT-BB, wherein the request further comprises a pickup location, wherein the rendering further comprises a representation of the pickup location, and wherein the rendering, when viewed by the user, allows the user to locate the vehicle or the pickup location.

BD: A non-transitory computer-readable medium storing instructions that, when executed, cause one or more processors to perform operations comprising: receiving, from a user device, a request for data, the request comprising a request for transportation; receiving, from a sensor of a vehicle, sensor data representing an environment proximate to a user associated with the user device; generating, based at least in part on the sensor data, a rendering comprising at least one of a computer-generated representation of the vehicle in the environment or a representation of the user in the environment; and sending, to the user device and based at least in part on the request, the rendering, which, when viewed by the user, allows the user to locate the vehicle.

BE: The non-transitory computer-readable medium of paragraph BD, wherein the rendering represents the environment from a perspective, and wherein the computer-generated representation of the vehicle represents the vehicle in the environment from the perspective.

BF: The non-transitory computer-readable medium of paragraph BE, the operations further comprising: determining, based at least in part on the sensor data, a location of the vehicle in the environment; accessing, based at least in part on the location, map data associated with the environment; and generating the rendering based at least in part on the perspective and the map data.

BG: The non-transitory computer-readable medium of any of paragraphs BD-BF, wherein the rendering is a first rendering, the operations further comprising: determining, based at least in part on the sensor data, a position of the vehicle at a first time, the first rendering representing the environment at the first time; determining, based at least in part on updated sensor data, an updated position of the vehicle at a second time; generating, based at least in part on the updated sensor data, a second rendering comprising the computer-generated representation of the vehicle in the environment at the second time; and sending, to the user device, the second rendering.

BH: The non-transitory computer-readable medium of any of paragraphs BD-BG, wherein the request further comprises a pickup location, and wherein the rendering further comprises a representation of the pickup location.

While the example clauses described above are described with respect to one particular implementation, it should be understood that, in the context of this document, the content of the example clauses can also be implemented via a method, device, system, and/or a computer-readable medium.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving, from a user device, a request for transportation by an autonomous vehicle and a request for image data defined by a non-orthogonal virtual perspective;
receiving location data associated with the user device;
capturing, using a sensor of the autonomous vehicle and based at least in part on the location data, sensor data associated with a sensor perspective that differs from the non-orthogonal virtual perspective;
determining, based at least in part on the sensor data, a distance between the autonomous vehicle and the user device;
determining, as the image data and based at least in part on the distance being at or below a threshold distance, a representation of an environment proximate to the user device comprising an indication associated with the autonomous vehicle, the environment including at least one of a user or the autonomous vehicle being defined by the non-orthogonal virtual perspective; and
sending, to the user device, the image data,
wherein the image data, when viewed by the user associated with the user device, allows the user to locate the autonomous vehicle.

2. The system of claim 1, wherein determining the image data further comprises:
capturing first image data of the environment using a first image sensor of the autonomous vehicle;

capturing second image data of the environment using a second image sensor of the autonomous vehicle; and generating, as the image data, a combined image including at least a portion of the first image data and at least a portion of the second image data.

3. The system of claim 1, wherein the instructions, when executed, cause the one or more processors to perform further operations comprising:

determining, based at least in part on the image data or light detection and ranging (LIDAR) data, a position of the autonomous vehicle with respect to a map; and generating, based at least in part on the position of the autonomous vehicle, a computer-generated image comprising a computer-generated representation of the autonomous vehicle and a portion of the map associated with the position, wherein the portion of the image data comprises the computer-generated image.

4. The system of claim 1, wherein the image data is first image data, and wherein the first image data comprises a first representation of the user, and wherein the instructions, when executed, cause the one or more processors to perform further operations comprising:

receiving, from the user device or a user profile associated with the user device, second image data comprising a second representation of the user; and determining that the first image data comprises the first representation of the user based at least in part on an image recognition algorithm and the second representation of the user.

5. The system of claim 1, wherein the request comprises a request that the autonomous vehicle navigate to a pickup location, and wherein the instructions, when executed, cause the one or more processors to perform further operations comprising:

generating a rendering comprising a representation of the pickup location.

6. The system of claim 1, wherein:

the sensor perspective is sent to the user device to be presented via a display of the user device, and the non-orthogonal virtual perspective is sent to the user device to be presented via the display of the user device.

7. The system of claim 1, wherein the instructions, when executed, cause the one or more processors to perform further operations comprising:

receiving, as an interaction, at least one of a panning interaction, a rotating interaction, or a zooming interaction;

updating, as an updated perspective, the non-orthogonal virtual perspective based on the interaction; and sending, to the user device, the updated perspective.

8. The system of claim 1, the operations further comprising:

recognizing the user based at least in part on profile image data associated with the user, and based on the user being recognized and the distance being at or below the threshold distance, sending, to the user device, the image data including the indication associated with the autonomous vehicle.

9. A method comprising:

receiving, from a user device, a request for transportation and a request for data;

receiving location data associated with the user device;

receiving, from a sensor of a vehicle, sensor data associated with a sensor perspective;

determining a distance between the vehicle and the user device;

generating, based at least in part on the sensor data and the distance being less than or equal to a threshold distance, image data comprising a representation of an environment proximate to the user device and an indication associated with the vehicle, the environment in the representation including at least one of a user or the vehicle being defined by a non-orthogonal virtual perspective; and sending, to the user device and based at least in part on the request, the image data, the image data allowing the user associated with the user device to locate the vehicle.

10. The method of claim 9, further comprising:

determining, based at least in part on the sensor data, a vehicle position or vehicle orientation associated with the vehicle in the environment;

accessing, based at least in part on the vehicle position, map data associated with the environment; and generating, based at least in part on the map data, the vehicle position or vehicle orientation, and a viewing perspective, a rendering.

11. The method of claim 10, wherein the image data is acquired from a camera on the vehicle, wherein the map data comprises a mesh representation of the environment, and wherein generating the rendering comprises:

associating the image data with the mesh representation; and generating, as the rendering, a computer-generated representation of the vehicle on the mesh representation as viewed from the viewing perspective.

12. The method of claim 10, further comprising:

receiving a user position from the user device, wherein the rendering further comprises a computer-generated representation of the user associated with the user device at the user position with respect to the map data as viewed from the viewing perspective.

13. The method of claim 10, wherein the viewing perspective is a first viewing perspective, the method further comprising:

receiving, from the user device, a second viewing perspective, the second viewing perspective differing from the first viewing perspective;

generating, based at least in part on the map data, a second rendering comprising a computer-generated representation of the vehicle with respect to the map data as viewed from the second viewing perspective; and sending, to the user device, the second rendering.

14. The method of claim 9, further comprising:

determining that the sensor data comprises a representation of the user based at least in part on comparing the sensor data with a known representation of the user.

15. The method of claim 9, wherein the sensor data further comprises light detection and ranging (LIDAR) data acquired from a LIDAR device on the vehicle.

16. The method of claim 9, wherein the request further comprises a pickup location, further comprising:

generating a rendering comprising a representation of the pickup location, and wherein the rendering, when viewed by the user, allows the user to locate the vehicle or the pickup location.

17. The method of claim 9, wherein the representation is a semi-photorealistic representation.

18. A non-transitory computer-readable medium storing instructions that, when executed, cause one or more processors to perform operations comprising:
- receiving, from a user device, a request for transportation and a request for data;
- receiving location data associated with the user device;
- receiving, from a sensor of a vehicle and based at least in part on the location data, sensor data associated with a sensor perspective;
- determining, based at least in part on the location data, a distance between the vehicle and the user device;
- generating, based at least in part on the sensor data and the distance being less than or equal to a threshold distance, image data comprising a representation of an environment proximate to the user device, the image data further comprising an indication associated with the vehicle, the environment in the representation including at least one of a user or the vehicle being defined by a non-orthogonal virtual perspective; and
- sending, to the user device and based at least in part on the request, the image data, which, when viewed by the user associated with the user device, allows the user to locate the vehicle.

19. The non-transitory computer-readable medium of claim 18, wherein the instructions, when executed, cause the one or more processors to perform further operations comprising:
- determining, based at least in part on the sensor data, a location of the vehicle in the environment;
- accessing, based at least in part on the location, map data associated with the environment; and
- generating a rendering that represents the environment from the non-orthogonal virtual perspective based at least in part on the non-orthogonal virtual perspective and the map data, the rendering comprising a computer-generated representation of the vehicle in the environment from the non-orthogonal virtual perspective.

20. The non-transitory computer-readable medium of claim 18, wherein the instructions, when executed, cause the one or more processors to perform further operations comprising:
- generating, based at least in part on the sensor data, a first rendering;
- determining, based at least in part on the sensor data, a position of the vehicle at a first time, the first rendering representing the environment at the first time;
- determining, based at least in part on updated sensor data, an updated position of the vehicle at a second time;
- generating, based at least in part on the updated sensor data, a second rendering comprising a computer-generated representation of the vehicle in the environment at the second time; and
- sending, to the user device, the second rendering.

* * * * *